United States Patent [19]

Jahnke et al.

[11] Patent Number: 5,620,946
[45] Date of Patent: Apr. 15, 1997

[54] COMPOSITIONS CONTAINING COMBINATIONS OF SURFACTANTS AND DERIVATIVES OF SUCCININC ACYLATING AGENT OR HYDROXYAROMATIC COMPOUNDS AND METHODS OF USING THE SAME

[75] Inventors: Richard W. Jahnke, Mentor; Lawrence J. Kocurek, Willowick; James H. Bush, Mentor, all of Ohio

[73] Assignee: The Lubrizol Corporation, Wickliffe, Ohio

[21] Appl. No.: 242,589

[22] Filed: May 13, 1994

Related U.S. Application Data

[63] Continuation-in-part of Ser. No. 908,097, Jul. 2, 1992, abandoned, which is a continuation-in-part of Ser. No. 852,872, Mar. 17, 1992, Pat. No. 5,330,662.

[51] Int. Cl.$^6$ .......................................... C09K 7/02
[52] U.S. Cl. ...................... 507/131; 507/133; 507/244; 507/246; 507/925
[58] Field of Search ............................ 507/131, 133, 507/244, 246, 925

[56] References Cited

U.S. PATENT DOCUMENTS

| | | | |
|---|---|---|---|
| 3,215,707 | 11/1965 | Rense | 260/326.3 |
| 3,219,666 | 11/1965 | Norman et al. | 360/268 |
| 3,231,587 | 1/1966 | Rense | 260/346.8 |
| 3,381,022 | 4/1968 | Le Suer | 260/404.8 |
| 3,522,179 | 7/1970 | Le Suer | 252/51.5 |
| 3,912,764 | 10/1975 | Palmer, Jr. | 260/346.8 |
| 3,980,569 | 9/1976 | Pin dar et al. | 252/51.5 R |
| 4,110,349 | 8/1978 | Cohen | 260/346.8 R |
| 4,120,800 | 10/1978 | Valcho et al. | 252/8.554 |
| 4,122,020 | 10/1978 | Valcho et al. | 252/8.554 |
| 4,140,640 | 2/1979 | Scherubel | 252/8.55 C |
| 4,234,435 | 11/1980 | Meinhardt et al. | 252/51.5 |
| 4,306,980 | 12/1981 | Brandt | 252/8.5 P |
| 4,329,249 | 5/1982 | Forsberg | 252/34.7 |
| 4,368,133 | 1/1983 | Forsberg | 252/75 |
| 4,435,297 | 3/1984 | Forsberg | 252/34.7 |
| 4,436,636 | 3/1984 | Carnicom | 252/8.5 P |
| 4,447,348 | 5/1984 | Forsberg | 252/75 |
| 4,448,703 | 5/1984 | Forsberg | 252/75 |
| 4,454,059 | 6/1984 | Pindar | 252/51.5 R |
| 4,708,753 | 11/1987 | Forsberg | 149/2 |
| 4,770,803 | 9/1988 | Forsberg | 252/75 |
| 4,776,966 | 10/1988 | Baker | 252/8.515 |
| 4,816,551 | 3/1989 | Ochler et al. | 528/295.3 |
| 4,828,633 | 5/1989 | Forsberg | 149/2 |
| 5,330,662 | 7/1994 | Jahnke et al. | 507/103 |

FOREIGN PATENT DOCUMENTS

| | | | |
|---|---|---|---|
| 144219 | 6/1920 | Germany . | |
| 2024855 | 1/1980 | United Kingdom | 3/30 |

OTHER PUBLICATIONS

PCT Publication WO86/03987, Quinn, Jul. 17, 1986.
OTC 5904, 1989 Offshore technology Conference –Optimising Oil Muds for Offshore Drilling and Lower Environmental Impact by R. P. Jachnik & D.S. Marshall, Milpark Drilling Fluids, pp. 203–212.

*Primary Examiner*—Philip Tucker
*Attorney, Agent, or Firm*—John H. Engelmann; David M. Shold; Frederick D. Hunter

[57] ABSTRACT

This invention relates to a composition comprising a mixture of a brine and a liquid oil, and (A) an emulsifying amount of (i) at least one reaction product of a hydrocarbyl-substituted succinic acylating agent, and at least one of (a) ammonia, (b) an alcohol, or (c) an amine, or at least one salt of the reaction product; or (ii) at least one reaction product of a hydroxyaromatic compound, an aldehyde, and an amine, and (B) at least one surfactant selected from the group consisting of a polyoxyalkylene amine, a polyoxyalkylene amide, a polyoxyalkylene alcohol, a polyoxyalkylene phenol, a polyoxyalkylene ester, a fatty acid salt, an amine or an alkaline earth or transition metal sulfonate, or a reaction product of a hydroxyamine or a polyalkylenepolyamine with an acylating agent selected from the group consisting of a fatty monocarboxylic acylating agents, a dicarboxylic acylating agent other than a succinic acylating agent, and a tricarboxylic acylating agent. The compositions of the present invention have beneficial emulsion and viscosity properties. These compositions are useful in drilling, working and completing well bore holes.

51 Claims, No Drawings

COMPOSITIONS CONTAINING COMBINATIONS OF SURFACTANTS AND DERIVATIVES OF SUCCININC ACYLATING AGENT OR HYDROXYAROMATIC COMPOUNDS AND METHODS OF USING THE SAME

This is a continuation-in-part of application Ser. No. 07/908,097 filed on Jul. 2, 1992 abandoned which is a continuation-in-part of Ser. No. 07/852,872 filed on Mar. 17, 1992 U.S. Pat. No. 5,330,662.

TECHNICAL FIELD

This invention relates to compositions containing an emulsifying amount of reaction products of hydrocarbyl-substituted succinic acylating agents or hydroxyaromatic compounds and a surfactant.

BACKGROUND OF THE INVENTION

The primary functions of a drilling fluid or mud are: to carry chips and cuttings produced by drilling to the surface; to lubricate and cool the drill bit and drill string; to form a filter cake which obstructs filtrate invasion in the formation; to maintain the walls of the borehole; to control formation pressures and prevent lost returns; to suspend cuttings during rig shutdowns; and to protect the formation for later successful completion and production.

Useful drilling fluids or muds must maintain rheological and viscosity properties under normal operation conditions. Also, the drilling fluids or muds must be able to suspend cuttings and weighting materials upon stopping of circulation of the drilling fluid. It is desirable to have drilling fluids or muds which maintain thixotropy and rheology even with increased solids.

In drilling muds, weighting agents and organophilic clays are used to provide higher viscosity and density to the muds. Typically the drilling mud is an water-in-oil emulsion. The weighting agents and organophilic clays are usually in the oil phase of the muds. If these material become water wet (e.g. present in the brine phase of the emulsion), then the emulsion is weakened. If the emulsion is weakened sufficiently, the emulsion may flip, e.g. go from an water-in-oil (e.g. invert) emulsion to a oil-in-water (regular) emulsion. When the emulsion flips, it renders it unusable in well-drilling applications.

It is desirable to prepare compositions which have viscosity and density properties sufficient for drilling operations.

U.S. Pat. Nos. 3,215,707; 3,219,666; 3,231,587; 3,381,022; 3,522,179; 3,912,764; 4,110,349; 4,234,435 and UK 1,440,219 relate to succinic acylating agents and reaction products of succinic acylating agents and alcohols, amines, or ammonia, and methods of making the same.

U.S. Pat. Nos. 3,980,569 and 4,454,059 relate to reaction products of hydroxyaromatic compounds, aldehydes and amines.

U.S. Pat. No. 4,140,640 relates to a self-breaking retarded acid emulsion. The emulsion comprises an aqueous acidizing solution, an oil, an effective amount of an alkyl $C_8$–$C_{18}$ primary fatty amine and at least one diethanolamide of at least one $C_8$–$C_{18}$ fatty acid.

U.S. Pat. No. 4,306,980 relates to invert emulsion well servicing fluids. The fluids can be formed by combining certain oleophilic anhydrides and lime in a water-in-oil emulsion comprising a liquid oleaginous phase and an aqueous phase. The oleophilic anhydrides include alkenyl succinic anhydrides and polymers of alkenyl succinic anhydride, such as alpha-olefin copolymers.

U.S. Pat. Nos. 4,329,249; 4,368,133; 4,435,297; 4,447,348; and 4,448,703 relate to reaction products of a carboxylic acylating agent and a hydroxyamine.

U.S. Pat. No. 4,436,636 relates to invert emulsion well servicing fluids. The fluid comprises a liquid oleaginous phase, an aqueous phase, an emulsifying agent and a solid particulate polyolefin. The emulsifying agent may be a polyamide type formed by the reaction of a polyamine with fatty acids and a dibasic acid.

U.S. Pat. No. 4,708,753 relates to water-in-oil emulsions. The emulsion comprises a continuous oil phase, a discontinuous aqueous phase, at least one salt derived from a hydrocarbyl-substituted carboxylic acid or anhydride, or ester or a derivative of said acid or ester and an amine, and a water-soluble, oil-insoluble functional additive dissolved in the aqueous phase, with a proviso that when ammonium nitrate is the functional additive, then the salt is other than an ester/salt formed from the reaction of a polyisobutenyl ($\overline{M}n$=950)-substituted succinic anhydride with diethylethanolamine in a ratio of one equivalent of anhydride to one equivalent of amine.

U.S. Pat. No. 4,776,966 relates to water in oil emulsion drilling fluid compositions in which a block or graft copolymer, of the general formula $(A\text{-}COO)_mB$, where A and B represent polymeric components derived from a specific type of oil-soluble complex monocarboxylic acid and from a water-soluble polyalkylene glycol or polyether polyol, respectively, and m is an integer at least 2, serves as the emulsifier. A surfactant containing a $C_{30\text{-}500}$ hydrocarbon chain as a hydrophobic component, and a polar component adsorbable on to the particulate solid surface serves as an agent for dispersing solid particulate matter in the oil phase. A particularly useful example of the emulsifier is a copolymer in which each A component is the residue of poly(12-hydroxystearic acid) chain terminated with stearic acid of molecular weight approximately 1750, and in which each B component is derived from polyethylene glycol of molecular weight 1500. This copolymer may be prepared by self condensation of commercial 12-hydroxystearic acid (which already contain a proportion of stearic acid which can function as a chain terminator), followed by reaction of the product with polyethylene glycol in the presence of an esterification catalyst. An example of a preferred dispersant is poly(isobutenyl)succinic anhydride having a molecular weight in the range of 400 to 5000. Optionally the succinic anhydride may be reacted with molecules containing a hydroxyl or an amino group.

SUMMARY OF THE INVENTION

This invention relates to a composition comprising a mixture of a brine and a liquid oil, and (A) an emulsifying amount of (i) at least one reaction product of a hydrocarbyl-substituted succinic acylating agent, and at least one of (a) ammonia, (b) an alcohol, or (c) an amine, or at least one salt of the reaction product; or (ii) at least one reaction product of a hydroxyaromatic compound, an aldehyde, and an amine, and (B) at least one surfactant selected from the group consisting of a polyoxyalkylene amine, a polyoxyalkylene amide, a polyoxyalkylene alcohol, a polyoxyalkylene phenol, a polyoxyalkylene ester, a fatty acid salt, an amine or an alkaline earth or transition metal sulfonate, or a reaction product of a hydroxyamine or a polyalkylenepolyamine with an acylating agent selected from the group consisting of a fatty monocarboxylic acylating agent, a dicarboxylic acylating agent other than a succinic acylating agent, and a tricarboxylic acylating agent. The compositions of the present invention do not include the block or graft copolymer emulsifiers, of the general formula $(A\text{-}COO)_mB$, described above, and disclosed in U.S. Pat. No. 4,776,966. The compositions of the present invention have beneficial emulsion and viscosity properties. These compositions are useful in drilling, working and completing well bore holes. The compositions of the present invention have beneficial viscosity, pumping and suspension properties. The surfactants of the compositions act as wetting agents for barites and organophilic clays. The surfactants may also act as an emulsifier as well as a wetting agent.

DESCRIPTION OF THE PREFERRED EMBODIMENTS

The term "emulsion" as used in the specification and the claims is intended to cover water-in-oil emulsions. The term is also intended to cover compositions derived from or formulated as water-in-oil emulsions which are gelatinuous or semi-gelatinuous compositions.

The term "hydrocarbyl" includes hydrocarbon, as well as substantially hydrocarbon, groups. Substantially hydrocarbon describes groups which contain non-hydrocarbon substituents which do not alter the predominantly hydrocarbon nature of the group.

Examples of hydrocarbyl groups include the following:

(1) hydrocarbon substituents, that is, aliphatic (e.g., alkyl or alkenyl), alicyclic (e.g., cycloalkyl, cycloalkenyl) substituents, aromatic-substituted aliphatic substituents or aromatic-substituted alicyclic substituents, or aliphatic- and alicyclic-substituted aromatic substituents and the like as well as cyclic substituents wherein the ring is completed through another portion of the molecule (that is, for example, any two indicated substituents may together form an alicyclic radical);

(2) substituted hydrocarbon substituents, that is, those substituents containing non-hydrocarbon groups which, in the context of this invention, do not alter the predominantly hydrocarbon nature of the substituent; those skilled in the art will be aware of such groups (e.g., halo (especially chloro and fluoro), hydroxy, alkoxy, mercapto, alkylthio, nitro, nitroso, sulfoxy, etc.);

(3) hetero substituents, that is, substituents which will, while having a predominantly hydrocarbon character within the context of this invention, contain an atom other than carbon present in a ring or chain otherwise composed of carbon atoms. Suitable heteroatoms will be apparent to those of ordinary skill in the art and include, for example, sulfur, oxygen, nitrogen and such substituents as, e.g., pyridyl, furyl, thienyl, imidazolyl, etc. In general, no more than about 2, preferably no more than one, non-hydrocarbon substituent will be present for every ten carbon atoms in the hydrocarbyl group. Typically, there will be no such non-hydrocarbon substituents in the hydrocarbyl group. In one embodiment, the hydrocarbyl group is purely hydrocarbon.

As used in the specification and claims a "barrel" is 42 gallons U.S.

As described above, the present invention relates to a composition containing (A) an emulsifying amount of (i) at least one reaction product of a hydrocarbyl-substituted succinic acylating agent, and (a) ammonia, (b) an alcohol, or (c) an amine, or at least one salt of the reaction product; or (ii) at least one reaction product of a hydroxyaromatic compound, an aldehyde, and an amine and a surfactant selected from the group consisting of a polyoxyalkylene amine, a polyoxyalkylene amide, a polyoxyalkylene alcohol, a polyoxyalkylene phenol, a polyoxyalkylene ester, a fatty acid salt, an amine or an alkaline earth or transition metal sulfonate, or a reaction product of a carboxylic acylating agent selected from the group consisting of monocarboxylic acylating agents, dicarboxylic acylating agents other than succinic acylating agents and tricarboxylic acylating agents.

A-(i) Reaction Products of Succinic Acylating Agents

The hydrocarbyl-substituted succinic acylating agents include succinic acids, halides, esters, and anhydrides, preferably, acids, esters or anhydrides, more preferably anhydrides. The hydrocarbyl group generally contains an average of at least about 8, or about 30, or about 35 up to about 350, or to about 200, or to about 100 carbon atoms. In one embodiment, the hydrocarbyl group is derived from a polyalkene.

The polyalkene is characterized by an $\overline{M}n$ (number average molecular weight) of at least about 500. Generally, the polyalkene is characterized by an an of $\overline{M}n$ about 500, or about 700, or about 800, or even about 900 up to about 5000, or to about 2500, or to about 2000, or even to about 1500. In another embodiment $\overline{M}n$ varies between about 500, or about 700, or about 800 up to about 1200 or to about 1300.

The polyalkenes include homopolymers and interpolymers of polymerizable olefin monomers of 2 to about 16 or to about 6, or to about 4 carbon atoms. The olefins may be monoolefins such as ethylene, propylene, 1-butene, isobutene, and 1-octene; or a polyolefinic monomer, such as diolefinic monomer, such 1,3-butadiene and isoprene. In one embodiment, the interpolymer is a homopolymer. An example of a homopolymer is a polybutene. In one instance about 50% of the polybutene is derived from isobutylene. The polyalkenes are prepared by conventional procedures.

In one embodiment, the hydrocarbyl groups are derived from polyalkenes having an $\overline{M}n$ of at least about 1300, or about 1500 up to about 5000, or to about 3000, or to about 2500, or to about 2000, and the $\overline{M}w/\overline{M}n$ is from about 1.5 or about 1.8, or about 2, or to about 2.5 to about 3.6, or to about 3.2. The preparation and use of substituted succinic acylating agents wherein the substituent is derived from such polyalkenes are described in U.S. Pat. No. 4,234,435, the disclosure of which is hereby incorporated by reference.

In another embodiment, the succinic acylating agents are prepared by reacting the above described polyalkene with an excess of maleic anhydride to provide substituted succinic acylating agents wherein the number of succinic groups for each equivalent weight of substituent group is at least 1.3, or to about 1.5, or to about 1.7, or to about 1.8. The maximum number generally will not exceed 4.5, or to about 2.5, or to about 2.1, or to about 2.0.

The polyalklene may be any of those described above. In one embodiment, the polyalkene has an $\overline{M}n$ from about 1300, or about 1500, or to about 1600 to about 5000, or to about 2800, or to about 2400, or to about 2000 and a $\overline{M}w/\overline{M}n$ of at least 1.5, as described above. The preparation and use of substituted succinic acylating agents wherein the substituent is derived from such polyolefins are described in U.S. Pat. No. 4,234,435, the disclosure of which is hereby incorporated by reference.

In another embodiment, the hydrocarbyl group contains an average from about 8, or about 10, or about 12 up to about 40, or to about 30, or to about 24, or to about 20 carbon atoms. In one embodiment, the hydrocarbyl group contains an average from about 16 to about 18 carbon atoms. In another embodiment, the hydrocarbyl group is tetrapropenyl group. In one embodiment, the hydrocarbyl group is an alkenyl group.

The hydrocarbyl group may be derived from one or more olefins having from about 2 to about 40 carbon atoms or oligomers thereof. These olefins are preferably alpha-olefins (sometimes referred to as mono-1-olefins) or isomerized alpha-olefins. Examples of the alpha-olefins include ethylene, propylene, butylene, 1-octene, 1-nonene, 1-decene, 1-dodecene, 1-tridecene, 1-tetradecene, 1-pentadecene, 1-hexadecene, 1-heptadecene, 1-octadecene, 1-nonadecene, 1-eicosene, 1-henicosene, 1-docosene, 1-tetracosene, etc. Commercially available alpha-olefin fractions that may be used include the $C_{15-18}$ alpha-olefins, $C_{12-16}$ alpha-olefins, $C_{14-16}$ alpha-olefins, $C_{14-18}$ alpha-olefins, $C_{16-18}$ alpha-olefins, $C_{16-20}$ alpha-olefins, $C_{22-28}$ alpha-olefins, etc. In one embodiment, the olefins are $C_{16}$ and $C_{16-18}$ alpha-olefins. Additionally, $C_{30}+$ alpha-olefin fractions such as those available from Gulf Oil Company under the name Gulftene can be used. In one embodiment, the olefin monomers include ethylene, propylene and 1-butene.

Isomerized alpha-olefins are alpha-olefins that have been converted to internal olefins. The isomerized alpha-olefins suitable for use herein are usually in the form of mixtures of internal olefins with some alpha-olefins present. The procedures for isomerizing alpha-olefins are well known to those in the art. Briefly these procedures involve contacting alpha-olefin with a cation exchange resin at a temperature in a range of about 80° to about 30° C. until the desired degree of isomerization is achieved. These procedures are described for example in U.S. Pat. No. 4,108,889 which is incorporated herein by reference.

The mono-olefins may be derived from the cracking of paraffin wax. The wax cracking process yields both even and odd number $C_{6-20}$ liquid olefins of which 85% to 90% are straight chain 1-olefins. The balance of the cracked wax olefins is made up of internal olefins, branched olefins, diolefins, aromatics and impurities. Distillation of the $C_{6-20}$ liquid olefins, obtained from the wax cracking process, yields fractions (e.g., $C_{15-18}$ alpha-olefins) which are useful in preparing the succinic acylating agents.

Other mono-olefins can be derived from the ethylene chain growth process. This process yields even numbered straight-chain 1-olefins from a controlled Ziegler polymerization. Other methods for preparing the mono-olefins include chlorination-dehydrochlorination of paraffin and catalytic dehydrogenation of paraffins.

The above procedures for the preparation of mono-olefins are well known to those of ordinary skill in the art and are described in detail under the heading "Olefins" in the *Encyclopedia of Chemical Technology*, Second Edition, Kirk and Othmer, Supplement, Pages 632,657, Interscience Publishers, Div. of John Wiley and Son, 1971, which is hereby incorporated by reference for its relevant disclosures pertaining to methods for preparing mono-olefins.

The succinic acylating agents are prepared by reacting the above-described olefins, isomerized olefins or oligomers thereof with unsaturated carboxylic acylating agents, such as itaconic, citraconic, or maleic acylating agents at a temperature of about 160°, or about 185° C. up to about 240° C., or to about 210° C. Maleic acylating agents are the preferred unsaturated acylating agent. The procedures for preparing the acylating agents are well known to those skilled in the art and have been described for example in U.S. Pat. No. 3,412,111; and Ben et al, "The Ene Reaction of Maleic Anhydride With Alkenes", J. C. S. Perkin II (1977), pages 535–537. These references are incorporated by reference for their disclosure of procedures for making the above acylating agents. In one embodiment, the alkenyl group is derived from oligomers of lower olefins, i.e., olefins containing from 2 to about 6, or about 4 carbon atoms. Examples of these olefins include ethylene, propylene and butylene.

The olefin, olefin oligomer, or polyalkene may be reacted with the carboxylic reagent such that there is at least one mole of carboxylic reagent for each mole of olefin, olefin oligomer, or polyalkene that reacts. Preferably, an excess of carboxylic reagent is used. In one embodiment, this excess is between about 5% to about 25%. In another embodiment, the excess is greater than 40%, or greater than 50%, and even greater than 70%.

The conditions, i.e., temperature, agitation, solvents, and the like, for forming the hydrocarbyl-substituted succinic acylating agent, are known to those in the art. Examples of patents describing various procedures for preparing useful acylating agents include U.S. Pat. Nos. 3,215,707 (Rense); 3,219,666 (Norman et al); 3,231,587 (Rense); 3,912,764 (Palmer); 4,110,349 (Cohen); and 4,234,435 (Meinhardt et al); and U.K. 1,440,219. The disclosures of these patents are hereby incorporated by reference.

The above described hydrocarbyl-substituted succinic acylating agents are reacted with (a) ammonia, (b) an alcohol, or (c) an amine to form reaction product A-(i).

(b) Alcohols

The alcohols include compounds of general formula $R''(OH)_m$ wherein $R''$ is a monovalent or polyvalent organic group joined to the —OH groups through a carbon bond, and m is an integer of from 1 (in one embodiment two) to about 10, or to about 6 wherein the organic group is a hydrocarbyl group. In one embodiment, $R''$ contains 2, or about 3, or about 4 up to about 40, or to about 30, or to about 24 carbon atoms. The alcohols may be aliphatic compounds such as monohydric and polyhydric alcohols, or aromatic compounds such as phenols and naphthols. The aromatic alcohols from which the esters may be derived are illustrated by the following specific examples: phenol, beta-naphthol, alpha-naphthol, cresol, resorcinol, catechol, p,p'-dihydroxybiphenyl, 2-chlorophenol, 2,4-dibutylphenol, etc.

The alcohols may contain 2, or about 3, or about 4, up to about 40 aliphatic carbon atoms, or to about 30, or to about 24 carbon atoms. They may be monohydric alcohols such as methanol, ethanol, isooctanol, dodecanol, cyclohexanol, etc. In one embodiment, the alcohols are polyhydric alcohols, such as alkylene polyols. The polyhydric alcohols generally contain from 2 to about 40, or to about 20 carbon atoms; and preferably from 2 to about 10, or to about 6 hydroxy groups. Examples of polyhydric alcohols include ethylene glycol, diethylene glycol, triethylene glycol, propylene glycol, dipropylene glycol, tripropylene glycol, glycerol, erythritol, dierythritol, trierythritol, pentaerythritol, dipentaerythritol, tripentaerythritol, butane diol, hexane diol, trimethylolpropane, neopentyl glycol, triglycerine, cyclohexane diol, and sugars such as sorbitol, arabitol, mannitol, sucrose, fructose, and glucose. In one embodiment, the alcohols include erythritol, pentaerythritol, trimethylolpropane, neopentylglycol, triglycerin, and a sugar.

The reaction product of the hydrocarbyl-substituted succinic acylating agent and the alcohol may be prepared by any of several known methods. One method involves reacting the succinic acylating agents described above with one or more alcohols or phenols in ratios from about 0.5 equivalent to about 4 equivalents of alcohol per equivalent of acylating agent. The reaction is usually carried out at a temperature above about 100° C., preferably between 150° C. and 300° C. The water formed as a by-product is removed by distillation as the esterification proceeds. The preparation of useful esters is described in U.S. Pat. Nos. 3,522,179 and 4,234,435.

In one embodiment, the hydrocarbyl-substituted succinic acylating agent is reacted with an alcohol and ammonia or an amine. The amines are described below. In one embodiment, the amines are a polyamine.

The ammonia or amine is added in an amount sufficient to neutralize any nonesterified carboxyl groups. In one embodiment, about 1.0 to 2.0 equivalents, or to 1.8 equivalents of alcohols, and about 0.02 up to about 0.3, or to about 0.25 equivalent of ammonia or amine is reacted with each equivalent of acylating agent.

In another embodiment, the succinic acid acylating agent may be reacted simultaneously with both the alcohol and the amine. There is generally at least about 0.01 equivalent of the alcohol and at least about 0.01 equivalent of the ammonia or amine although the total amount of equivalents of the combination should be at least about 0.5 equivalent per equivalent of acylating agent. These reaction products are known in the art, and the preparation of a number of these derivatives is described in, for example, U.S. Pat. Nos. 3,957,854 and 4,234,435 which are hereby incorporated by reference.

The reaction products of succinic acylating agents, alcohols and optionally ammonia or amines and methods of making the same are known in the art and are disclosed in U.S. Pat. Nos. 3,219,666; 3,381,022; 3,522,179; and 4,234,435 which are hereby incorporated by reference for their disclosures of the preparation of carboxylic ester dispersants.

(c) Amines

The above-described succinic acylating agents may also be reacted with amines. The reaction products of the hydrocarbyl acylating agent and the amine may be amide, imide, imidazoline, amidine, ester, oxazoline, ammonium salt or mixtures thereof. When the amine is other than a hydroxyamine, then the reaction product may be amide, imide, amidine, ammonium salt or mixture thereof.

The amines may be monoamines or polyamines. In one embodiment, the amine is a polyamine, such as a polyethylene polyamine, an amine bottom or an amine condensate. The amines may be aliphatic, cycloaliphatic, aromatic, or heterocyclic, including aliphatic-substituted cycloaliphatic, aliphatic-substituted aromatic, aliphatic-substituted heterocyclic, cycloaliphatic-substituted aliphatic, cycloaliphatic-substituted heterocyclic, aromatic-substituted aliphatic, aromatic-substituted cycloaliphatic, aromatic-substituted heterocyclic, heterocyclic-substituted aliphatic, heterocyclic-substituted alicyclic, and heterocyclic-substituted aromatic amines and may be saturated or unsaturated.

The monoamines have hydrocarbyl groups each independently containing from 1, or about 2 to about 24 or to about 12, or to about 6 carbon atoms in each hydrocarbyl group. In one embodiment, the hydrocarbyl group is an alkyl group. Examples of monoamines useful in the present invention include methylamine, ethylamine, propylamine, butylamine, cyclopentylamine, cyclohexylamine, octylamine, dodecylamine, allylamine, cocoamine, stearylamine, and laurylamine. Examples of secondary amines include dimethylamine, diethylamine, dipropylamine, dibutylamine, dicyclopentylamine, dicyclohexylamine, methylbutylamine, ethylhexylamine, etc. Tertiary amines include trimethylamine, tributylamine, methyldiethylamine, ethyldibutylamine, etc.

In one embodiment, the amine may be a hydroxyamine. Typically, the hydroxyamines are primary, secondary or tertiary alkanolamines or mixtures thereof. Such amines can be represented by the formulae:

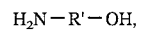

$$H_2N-R'-OH,$$

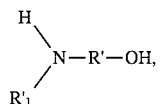

and

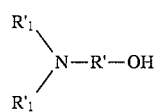

wherein each R' is independently a hydrocarbyl group of one to about eight carbon atoms or hydroxyhydrocarbyl group of one to about eight carbon atoms, or to about four, and R' is a divalent hydrocarbyl group of about two to about 18 carbon atoms, preferably two to about four. The group —R'—OH in such formulae represents a hydroxyhydrocarbyl group. R' can be an acyclic, alicyclic or aromatic group. Typically, R' is an acyclic straight or branched alkylene group such as an ethylene, 1,2-propylene, 1,2-butylene, 1,2-octadecylene, etc. group. Where two $R'_1$ groups are present in the same molecule they can be joined by a direct carbon-to-carbon bond or through a heteroatom (e.g., oxygen, nitrogen or sulfur) to form a 5-, 6-, 7- or 8-membered ring structure. Examples of such heterocyclic amines include N-(lower hydroxy alkyl)-morpholines, -thiomorpholines, -piperidines, -oxazolidines, -thiazolidines and the like. Typically, however, each $R'_1$ is independently a methyl, ethyl, propyl, butyl, pentyl or hexyl group.

In one embodiment, the alkanolamines are represented by the formula

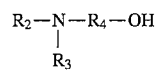

wherein $R_2$ and $R_3$ are each independently alkyl or hydroxyalkyl groups having from 1 to about 10, or to about 6, or to about 4 carbon atoms. $R_4$ is preferably an alkylene group having from 1, or about 2 up to about 10 or to about 4 carbon atoms. In another embodiment, $R_4$ contains 2 or 3 carbon atoms. In one embodiment, $R_2$ and $R_3$ are each independently a methyl, ethyl, propyl or butyl group.

Examples of these hydroxyamines include mono-, di- and triethanolamine, diethyl ethanolamine, di(3-hydroxypropyl)amine, N-(3-hydroxybutyl) amine, N-(4-hydroxybutyl)amine, N,N-di(2-hydroxypropyl) amine, N-(2-hydroxyethyl) morpholine and its thioanalog, N-(2-hydroxyethyl)cyclohexyl amine, N-(3-hydroxycyclopentyl) amine, ortho-, meta-, and para-aminophenol, N-(hydroxyethyl)piperazine, N,N'-di(hydroxyethyl)piperazine, and the like. Preferred amines are dimethylethanolamine and diethylethanolamine.

The hydroxyamines can also be an ether N-(hydroxyhydrocarbyl)amine. These are hydroxypoly(hydrocarbyloxy) analogs of the above-described hydroxyamines (these analogs also include hydroxyl-substituted oxyalkylene analogs). Such N-(hydroxyhydrocarbyl) amines can be conveniently prepared by reaction of epoxides with aforedescribed amines and can be represented by the formulae:

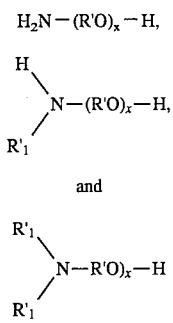

$$H_2N-(R'O)_x-H,$$

$$\begin{array}{c} H \\ \diagdown \\ N-(R'O)_x-H, \\ \diagup \\ R'_1 \end{array}$$

and $$\begin{array}{c} R'_1 \\ \diagdown \\ N-R'O)_x-H \\ \diagup \\ R'_1 \end{array}$$

wherein x is a number from about 2 to about 15 and $R_1'$ and $R'$ are as described above. $R'_1$ may also be a hydroxypoly-(hydrocarbyloxy) group.

In one embodiment, the reaction of the hydroxyamine and the hydrocarbyl substituted acylating agent is carried out under ester forming conditions and the product thus formed is an ester or ester/salt. The ester/salt may be an internal or external salt. In another embodiment, the reaction product is a mixture of internal and external salts. The external salt is the ionic linkage formed between the acylating agent and the nitrogen atom from the hydroxyamine, the amine being not otherwise bonded to the acylating agent. The internal salt is the ionic salt linkage between the carboxylic acylating agent and the nitrogen atom of the hydroxyamine where the acylating agent and hydroxyamine are also bonded together through a non-salt linkage (e.g., an ester linkage). Generally, the reaction is carried out at a temperature in the range of about 50° C. to about 150° C.; but usually at a temperature below a 100° C.

The reaction products made by reacting a carboxylic acylating agent and a hydroxyamine which are useful surfactants are described in U.S. Pat. Nos. 4,329,249; 4,368,133; 4,435,297; 4,447,348; and 4,448,703. These patents are incorporated by reference for their disclosure to the reaction products of carboxylic acylating agents and hydroxyamines as well as methods for making the same.

Suitable amines also include polyoxyalkylene polyamines, e.g., polyoxyalkylene diamines and polyoxyalkylene triamines, having average molecular weights ranging from about 200, or about 400 up to 4000, or to about 2000. Illustrative examples of these polyoxyalkylene polyamines may be characterized by the formulae: $NH_2$-Alkylene $(O\text{-Alkylene})_m NH_2$, wherein m has a value of about 3 to 70 and preferably about 10 to 35; and $R(Alkylene(O\text{-Alkylene})_n NH_2)_{3-6}$, wherein n is such that the total value is from about 1 to 40 with the proviso that the sum of all of the n's is from about 3 to about 70 and generally from about 6 to about 35 and R is a polyvalent saturated hydrocarbon radical of up to 10 carbon atoms having a valence of 3 to 6. The alkylene groups may be straight or branched chains and contain from 1 to 7 carbon atoms and usually from 1 to 4 carbon atoms. The various alkylene groups present may be the same or different.

The polyoxyalkylene polyamines include the polyoxyethylene and polyoxypropylene diamines and the polyoxypropylene triamines having average molecular weights ranging from about 200 to 2000. The polyoxyalkylene polyamines are commercially available and may be obtained, for example, from the Texaco Chemical Company, Inc. under the trade name "Jeffamines D-230, D-400, D-1000, D-2000, T-403, etc."

U.S. Pat. Nos. 3,804,763 and 3,948,800 are expressly incorporated herein by reference for their disclosure of such polyoxyalkylene polyamines and process for acylating them with carboxylic acid acylating agents which processes can be applied to their reaction with the acylating reagents used in this invention.

The amine which reacts with the succinic acylating agent may be a polyamine. The polyamine may be aliphatic, cycloaliphatic, heterocyclic or aromatic. Examples of the polyamines include alkylene polyamines, hydroxy containing polyamines, arylpolyamines, and heterocyclic polyamines.

Alkylene polyamines are represented by the formula

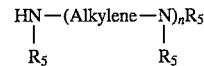

$$\begin{array}{c} HN-(Alkylene-N)_n R_5 \\ | \qquad\qquad\qquad | \\ R_5 \qquad\qquad\qquad R_5 \end{array}$$

wherein n has an average value from 1, or about 2 to about 10, or to about 7, or to about 5, and the "Alkylene" group has from 1, or about 2 to about 10, or to about 6, or to about 4 carbon atoms. Each $R_5$ is independently hydrogen, or an aliphatic or hydroxy-substituted aliphatic group of up to about 30 carbon atoms. In one embodiment, $R_5$ is defined the same as $R'_1$.

Such alkylenepolyamines include methylenepolyamines, ethylenepolyamines, butylenepolyamines, propylenepolyamines, pentylenepolyamines, etc. The higher homologs and related heterocyclic amines such as piperazines and N-aminoalkyl-substituted piperazines are also included. Specific examples of such polyamines are ethylenediamine, diethylenetriamine (DETA), triethylenetetramine (TETA), tris-(2-aminoethyl)amine, propylenediamine, trimethylenediamine, tripropylenetetramine, tetraethylenepentamine, hexaethyleneheptamine, pentaethylenehexamine, etc.

Higher homologs obtained by condensing two or more of the above-noted alkylene amines are similarly useful as are mixtures of two or more of the aforedescribed polyamines.

Ethylenepolyamines, such as those mentioned above, are useful. Such polyamines are described in detail under the heading Ethylene Amines in Kirk Othmer's "Encyclopedia of Chemical Technology", 2d Edition, Vol. 7, pages 22–37, Interscience Publishers, New York (1965). Such polyamines are most conveniently prepared by the reaction of ethylene dichloride with ammonia or by reaction of an ethylene imine with a ring opening reagent such as water, ammonia, etc. These reactions result in the production of a complex mixture of polyalkylenepolyamines including cyclic condensation products such as the aforedescribed piperazines. Ethylenepolyamine mixtures are useful.

Other useful types of polyamine mixtures are those resulting from stripping of the above-described polyamine mixtures to leave as residue what is often termed "polyamine bottoms". In general, alkylenepolyamine bottoms can be characterized as having less than two, usually less than 1% (by weight) material boiling below about 200° C. A typical sample of such ethylene polyamine bottoms obtained from the Dow Chemical Company of Freeport, Texas designated "E-100" has a specific gravity at 15.6° C. of 1.0168, a percent nitrogen by weight of 33.15 and a viscosity at 40° C. of 121 centistokes. Gas chromatography analysis of such a sample contains about 0.93% "Light Ends" (most probably DETA), 0.72% TETA, 21.74% tetraethylene pentamine and 76.61% pentaethylenehexamine and higher (by weight). These alkylenepolyamine bottoms include cyclic condensation products such as piperazine and higher analogs of diethylenetriamine, triethylenetetramine and the like.

These alkylenepolyamine bottoms can be reacted solely with the acylating agent or they can be used with other amines, polyamines, or mixtures thereof.

Another useful polyamine is a condensation reaction between at least one hydroxy compound with at least one polyamine reactant containing at least one primary or secondary amino group. The hydroxy compounds are preferably polyhydric alcohols and amines. The polyhydric alcohols are described above. Preferably the hydroxy compounds are polyhydric amines. Polyhydric amines include any of the above-described monoamines reacted with an alkylene oxide (e.g., ethylene oxide, propylene oxide, butylene oxide, etc.) having two to about 20, or to about four carbon atoms. Examples of polyhydric amines include tri(hydroxypropyl)amine, tris-(hydroxymethyl)amino methane, 2-amino-2-methyl-1,3-propanediol, N,N,N',N'-tetrakis(2-hydroxypropyl)ethylenediamine, and N,N,N',N'-tetrakis(2-hydroxyethyl)ethylenediamine, preferably tris(hydroxymethyl)aminomethane (THAM).

Polyamines, which react with the polyhydric alcohol or amine to form the condensation products or condensed amines, are described above. Preferred polyamine reactants include triethylenetetramine (TETA), tetraethylenepentamine (TEPA), pentaethylenehexamine (PEHA), and mixtures of polyamines such as the above-described "amine bottoms".

The condensation reaction of the polyamine reactant with the hydroxy compound is conducted at an elevated temperature, usually about 60° C. to about 265° C., (preferably about 220° C. to about 250° C.) in the presence of an acid catalyst.

The amine condensates and methods of making the same are described in U.S. Pat. No. 5,053,152 and PCT publication WO86/05501 which are incorporated by reference for their disclosure to the condensates and methods of making. The preparation of such polyamine condensates may occur as follows: A 4-necked 3-liter round-bottomed flask equipped with glass stirrer, thermowell, subsurface $N_2$ inlet, Dean-Stark trap, and Friedrich condenser is charged with: 1299 grams of HPA Taft Amines (amine bottoms available commercially from Union Carbide Co. with typically 34.1% by weight nitrogen and a nitrogen distribution of 12.3% by weight primary amine, 14.4% by weight secondary amine and 7.4% by weight tertiary amine), and 727 grams of 40% aqueous tris(hydroxymethyl)aminomethane (THAM). This mixture is heated to 60° C. and 23 grams of 85% $H_3PO_4$ is added. The mixture is then heated to 120° C. over 0.6 hour. With $N_2$ sweeping, the mixture is then heated to 150° C. over 1.25 hour, then to 235° C. over 1 hour more, then held at 230°–235° C. for 5 hours, then heated to 240° C. over 0.75 hour, and then held at 240°–245° C. for 5 hours. The product is cooled to 150° C. and filtered with a diatomaceous earth filter aid. Yield: 84% (1221 grams).

In another embodiment, the polyamines are hydroxy-containing polyamines. Hydroxy-containing polyamine analogs of hydroxymonoamines, particularly alkoxylated alkylenepolyamines (e.g., N,N(diethanol)ethylenediamine) may also be used. Such polyamines may be made by reacting the above-described alkylenepolyamines with one or more of the above-described alkylene oxides. Similar alkylene oxide-alkanolamine reaction products may also be used such as the products made by reacting the aforedescribed primary, secondary or tertiary alkanolamines with ethylene, propylene or higher epoxides in a 1:1 to 1:2 molar ratio. Reactant ratios and temperatures for carrying out such reactions are known to those skilled in the art.

Specific examples of alkoxylated alkylene polyamines include N-(2-hydroxyethyl)ethylenediamine, N,N-bis(2-hydroxyethyl)ethylenediamine, 1-(2-hydroxyethyl)piperazine, mono(hydroxypropyl)substituted tetraethylenepentamine, N-(3-hydroxybutyl)tetramethylene diamine, etc. Higher homologs obtained by condensation of the above-illustrated hydroxy-containing polyamines through amino groups or through hydroxy groups are likewise useful. Condensation through amino groups results in a higher amine accompanied by removal of ammonia while condensation through the hydroxy groups results in products containing ether linkages accompanied by removal of water. Mixtures of two or more of any of the aforesaid polyamines are also useful.

In another embodiment, the amine is a heterocyclic polyamine. The heterocyclic polyamines include aziridines, azetidines, azolidines, pyridines, pyrroles, indoles, piperidines, imidazoles, imidazoles, piperazines, isoindoles, purines, morpholines, thiomorpholines, N-aminoalkylmorpholines, N-aminoalkylthiomorpholines, N-aminoalkylpiperazines, N,N'-diaminoalkylpiperazines, azepines, azocines, azonines, azecines and tetra-, di- and perhydro derivatives of each of the above and mixtures of two or more of these heterocyclic amines. Preferred heterocyclic amines are the saturated 5- and 6-membered heterocyclic amines containing only nitrogen, oxygen and/or sulfur in the hetero ring, especially the piperidines, piperazines, thiomorpholines, morpholines, pyrrolidines, and the like. Piperidine, aminoalkyl-substituted piperidines, piperazine, aminoalkyl-substituted piperazines, morpholine, aminoalkyl-substituted morpholines, pyrrolidine, and aminoalkyl-substituted pyrrolidines, are especially preferred. Usually the aminoalkyl substituents are substituted on a nitrogen atom forming part of the hetero ring. Specific examples of such heterocyclic amines include N-aminopropylmorpholine, N-aminoethylpiperazine, and N,N'-diaminoethylpiperazine. Hydroxy heterocyclic polyamines are also useful. Examples include N-(2-hydroxyethyl)cyclohexylamine, 3-hydroxycyclopentylamine, parahydroxyaniline, N-hydroxyethylpiperazine, and the like.

Hydrazine and substituted-hydrazine can also be reacted with the hydrocarbyl-substituted succinic acylating agent. At least one of the nitrogens in the hydrazine must contain a hydrogen directly bonded thereto. Preferably there are at least two hydrogens bonded directly to hydrazine nitrogen and, more preferably, both hydrogens are on the same nitrogen. The substituents which may be present on the hydrazine include alkyl, alkenyl, aryl, aralkyl, alkaryl, and the like. Usually, the substituents are alkyl, especially lower alkyl, phenyl, and substituted phenyl such as lower alkoxy substituted phenyl or lower alkyl substituted phenyl. Specific examples of substituted hydrazines are methylhydrazine, N,N-dimethyl-hydrazine, N,N'-dimethylhydrazine, phenylhydrazine, N-phenyl-N'-ethylhydrazine, N-(para-tolyl)-N'-(n-butyl)-hydrazine, N-(para-nitrophenyl)-hydrazine, N-(para-nitrophenyl)-N-methyl-hydrazine, N,N'-di-(para-chlorophenol)-hydrazine, N-phenyl-N'-cyclohexylhydrazine, and the like.

The reaction products of hydrocarbyl-substituted succinic acylating agents and amines and methods for preparing the same are described in U.S. Pat. Nos. 4,234,435; 4,952,328; 4,938,881; 4,957,649; and 4,904,401, their disclosures are hereby incorporated by reference.

The following examples illustrate (i) the reaction products and its salts and methods for preparing the same. Unless otherwise indicated in the following examples, as well as elsewhere in the specification and claims, parts and percentages are by weight, temperature is degrees Celsius and pressure is atmospheric.

EXAMPLE 1

A mixture of 874 parts (2 equivalents) of a polybutenyl ($\overline{M}n=1000$) substituted succinic anhydride and 104 parts (2 equivalents) of neopentyl glycol is maintained at 240°–250°

C./30 mm for 12 hours. The residue is a mixture of the esters resulting from the esterification of one and both hydroxy groups of the glycol.

EXAMPLE 2

A mixture of 3225 parts (5.0 equivalents) of the polybutene ($\overline{M}n$=2020, Saponification number=87 (ASTM D-94)) substituted succinic anhydride, 289 parts (8.5 equivalents) of pentaerythritol and 5204 parts of mineral oil is heated at 224°–235° C. for 5.5 hours. The reaction mixture is filtered at 130° C. to yield an oil solution of the desired product.

EXAMPLE 3

A mixture of 1000 parts of polybutene having a number average molecular weight of about 1000 and 108 parts (1.1 moles) of maleic anhydride is heated to about 190° C. and 100 parts (1.43 moles) of chlorine are added beneath the surface over a period of about 4 hours while maintaining the temperature at about 185°–190° C. The mixture then is blown with nitrogen at this temperature for several hours, and the residue is the desired polybutenyl-substituted succinic acylating agent.

A solution of 1000 parts of the above-prepared acylating agent in 857 parts of mineral oil is heated to about 150° C. with stirring, and 109 parts (3.2 equivalents) of pentaerythritol are added with stirring. The mixture is blown with nitrogen and heated to about 200° C. over a period of about 14 hours to form an oil solution of the desired carboxylic ester intermediate. To the intermediate, there are added 19.25 parts (0.46 equivalent) of a commercial mixture of ethylene polyamines having an average of about 3 to about 10 nitrogen atoms per molecule. The reaction mixture is stripped by heating at 205° C. with nitrogen blowing for 3 hours and filtered. The filtrate is an oil solution (45% 100 neutral mineral oil) of the desired amine-modified carboxylic ester which contains 0.35% nitrogen.

EXAMPLE 4

A mixture of 3660 parts (6 equivalents) of a polybutenyl ($\overline{M}n$=1845, saponification number=87 (ASTM D94)) substituted succinic anhydride in 4664 parts of diluent oil is prepared and heated at about 110° C. whereupon nitrogen is blown through the mixture. To this mixture there are then added 210 parts (5.25 equivalents) of an alkylene polyamine mixture, comprising 80% of ethylene polyamine bottoms from Union Carbide and 20% of a commercial mixture of ethylene polyamines corresponding in empirical formula to diethylene triamine, over a period of one hour and the mixture is maintained at 110° C. for an additional 0.5 hour. The polyamine mixture is characterized as having an equivalent weight of about 43.3. After heating for 6 hours at 155° C. while removing water, a filtrate is added and the reaction mixture is filtered at about 150° C. The filtrate is the oil solution of the desired product.

EXAMPLE 5

2240 parts of polybutenyl ($\overline{M}n$=950) substituted succinic anhydride are heated to a temperature in the range of 110°–116° C. 174 parts of morpholine are then added dropwise to the anhydride. After completion of the addition of morpholine, the resulting mixture is maintained at a temperature of 116°–126°C. for two hours. 234 parts of diethylethanolamine are then added dropwise while the temperature is maintained at 116°–126° C. After completion of the addition of diethylethanolamine, the resulting mixture is maintained at 116°–126° C. for 50 minutes with stirring. The resulting product is an amide/salt.

EXAMPLE 6

A mixture of 1100 parts of the polybutenyl-substituted succinic anhydride used in Example 5 and 100 parts of Carbowax 200 (a product of Union Carbide identified as a polyethylene glycol having a molecular weight of 200) are heated to and then maintained at a temperature of 123°–134° C. maintained at said temperature for 2 hours, then cooled to 100° C. 117 parts of diethylethanolamine are added to the resulting product over a 0.2 hour period while maintaining the temperature at 100° C. The mixture is then cooled to room temperature. The product is an ester/salt.

EXAMPLE 7

A mixture of 1100 parts of the polybutenyl-substituted succinic anhydride used in Example 5 and 34 parts of pentaerythritol are heated to a temperature of 125°–160° C., maintained at said temperature for 4 hours, then adjusted to 130° C. 117 parts of diethylethanolamine are added to the mixture. The temperature is maintained at 100°–130° C. for 1 hour. The resulting product is then cooled to room temperature. The product is an ester/salt.

EXAMPLE 8

A mixture of 2240 parts of the polybutenyl-substituted succinic anhydride used in Example 5 and 62 parts of ethylene glycol are heated to a temperature in the range of 116°–120° C., then maintained at said temperature for 5 hours. The temperature of the mixture is then increased to a temperature in the range of 138°–146° C. and maintained at said increased temperature for an additional 4.5 hours. The temperature of the mixture is then decreased to 115° C. over a period of 0.5 hour. 122 parts of monoethanolamine are added to the mixture over a period of 0.5 hour while maintaining the temperature at 115°–120° C. The mixture is then stirred for an additional 0.5 hour while maintaining the temperature at 115°–120° C. The resulting product is an ester/salt.

EXAMPLE 9

A mixture of 917 parts of diluent oil, 40 parts of diatomaceous earth filter aid, 10 parts of caustic soda, 0.2 part of a silicone-based anti-foam agent, 135 parts of 3-amino-1,2, 4-triazole, and 6.67 parts of a commercial polyethylene polyamine mixture containing 33.5% nitrogen and substantially corresponding to tetraethylene pentamine are heated to a temperature of 121° C. with stirring. 1000 parts of the polybutenyl-substituted succinic anhydride used in Example 5 are slowly added to the mixture over a period of about one hour, and during such addition the temperature of the mixture is increased from 121° C. to 154° C. The mixture is then maintained at a temperature of 154°–160° C. with nitrogen blowing for 12 hours. The mixture is then cooled to 138°–149° C. and filtered. A final oil adjustment is made to adjust the product to a 45% by weight diluent oil.

EXAMPLE 10

A mixture of 2644 parts of the polybutenyl-substituted succinic anhydride used in Example 5 and 75 parts of ethylene glycol are heated to a temperature of 120° C., and maintained at said temperature for 4 hours. The temperature of the mixture is then increased to 160°–170° C., maintained at said temperature for 2 hours, then reduced to 120° C. 281 parts of diethylethanolamine are added to the mixture over a 15-minute period. The temperature of the mixture is maintained at 115°–120° C. for 1 hour. The mixture is then cooled to room temperature to provide the desired product.

EXAMPLE 11

A mixture of 2240 parts of the polybutenyl-substituted succinic anhydride used in Example 5 and 86 parts of piperazine are heated to a temperature of 116°–126° C. and maintained at said temperature for 2 hours. 234 parts of diethylethanolamine are added dropwise to the mixture. The temperature is maintained at 116°–126° C. for 50 minutes. The resulting product is then cooled to room temperature.

EXAMPLE 12

A reaction vessel is charged with 1000 parts of polybutenyl ($\overline{Mn}$=950) substituted succinic anhydride. The anhydride is heated with stirring to about 90° C. Then, N,N-diethylethanolamine (209 parts) is slowly added over a two hours. Heating is continued for an additional hour at 90° C. The heated reaction mixture is cooled to room temperature to provide the desired product.

EXAMPLES 13–22

Examples 13–22 are prepared by the procedure described in Example 12. The carboxylic acylating agent is reacted with the alkanolamine on an equal molar basis.

than two, aliphatic or alicyclic groups having at least about 6 (usually at least about 30, or at least about 50) carbon atoms and up to about 400 carbon atoms, or to about 300, or to about 200. These groups may be derived from the above described polyalkenes. In one embodiment, the hydroxyaromatic compound is a phenol substituted with an aliphatic or alicyclic hydrocarbon-based group having an $\overline{Mn}$ of about 420 to about 10,000.

In one embodiment, the hydroxyaromatic compounds are those of the formula

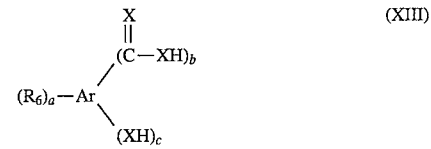

(XIII)

wherein $R_6$ is hydrogen or an aliphatic hydrocarbyl group preferably derived from the above-described polyalkenes, a is a number in the range of one to about four, usually one or two, Ar is an aromatic group, each X is independently sulfur or oxygen, preferably oxygen, b is a number in the range from zero to about four, usually one or two, c is a number in the range of one to about four, usually one to two, with the proviso that the sum of a, b and c does not exceed the number of valences of Ar.

$R_6$ is hydrogen, or said hydrocarbyl group having from 1 to about 100 carbon atoms such as an alkyl having from 1 or about 7 to about 30, or to about 20 carbon atoms, an alkenyl group having about 2, or to about 8 to about 30 or to about 20 carbon atoms, a cycloalkyl group having from about 4, or to about 5, to about 10, or to about 7 carbon

| EXAMPLE | CARBOXYLIC ACYLATING AGENT | ALKANOLAMINE |
|---|---|---|
| 13 | Hexadecenyl Succinic Anhydride | N,N'-dimethylethanolamine |
| 14 | Tetrapropenyl Succinic Anhydride | Diethanolamine |
| 15 | Polybutenyl ($\overline{Mn}$ = 1690) Succinic Anhydride | Triethanolamine |
| 16 | Hexadecenyl Succinic Anhydride | N,N'-diethylethanolamine |
| 17 | $C_{16-18}$ Substituted Succinic Anhydride | N,N'-diethylethanolamine |
| 18 | Polybutenyl ($\overline{Mn}$ = 950) Succinic Anhydride | Aminopropanol |
| 19 | Polybutenyl ($\overline{Mn}$ = 950) Succinic Anhydride | N,N'-dimethylethanolamine |
| 20 | Isostearylpentaethylene glycol-Acetic Acid | Ethanolamine |
| 21 | Polybutenyl ($\overline{Mn}$ = 950) Salicylic Acid | N,N'-diethylethanolamine |
| 22 | Polybutenyl ($\overline{Mn}$ = 950) Salicylic Acid | N,N'-dimethylethanolamine |

A-(ii) Reaction Products of Hydroxyaromatic Compounds

The compositions of the present invention may also include (ii) at least one reaction product of a hydroxyaromatic compound, an aldehyde, and an amine. These reaction products are generally referred to as Mannich reaction products. The reaction may occur from room temperature to 225° C., usually from 50° to about 200° C. (75° C.–150° C. most preferred), with the amounts of the reagents being such that the molar ratio of hydroxyaromatic compound to aldehyde to amine is in the range from about (1:1:1) to about (1:3:3).

The first reagent is a hydroxyaromatic compound. This term includes phenols (which are preferred), carbon-, oxygen-, sulfur- and nitrogen-bridged phenols and the like as well as phenols directly linked through covalent bonds (e.g. 4,4'-bis(hydroxy)biphenyl), hydroxy compounds derived from fused-ring hydrocarbon (e.g., naphthols and the like); and polyhydroxy compounds such as catechol, resorcinol and hydroquinone. Mixtures of one or more hydroxyaromatic compounds may be used as the first reagent.

In one embodiment, the hydroxyaromatic compounds are those substituted with at least one, and preferably not more atoms, an aromatic group having from about 6 to about 30 carbon atoms, an aromatic-substituted alkyl group or alkyl-substituted aromatic group having a total of from about 7 to about 30, to about 12 carbon atoms. In one embodiment, the hydrocarbyl substituent is an alkyl group having from 7 to about 20, or to about 14 carbon atoms. In one embodiment, the $R_6$ group is a hydrocarbyl group that is directly bonded to the aromatic group Ar. Examples of $R_6$ groups include substituents derived from any of the polyalkenes described above. Examples of useful polyalkenes include polyethylenes, polypropylenes, polyisobutylenes, ethylene-propylene copolymers, chlorinated olefin polymers and oxidized ethylene-propylene copolymers.

Examples of suitable hydrocarbyl-substituted hydroxyaromatic compounds include the various naphthols, and more preferably the various alkyl-substituted catechols, resorcinols, and hydroquinones, the various xylenols, the various cresols, aminophenols, and the like. Examples of various suitable compounds include heptylphenol, octylphenol, nonylphenol, decylphenol, dodecylphenol, tetrapropylphenol, eicosylphenol, and the like. Dodecylphenol, tetrapropylphenol and heptylphenol are especially preferred.

Examples of suitable hydrocarbyl-substituted thiol-containing aromatics include heptylthiophenol, octylthiophenol, nonylthiophenol, dodecylthiophenol, tetrapropylthiophenol, and the like. Examples of suitable thiol- and hydroxyaromatic compounds include dodecylmonothio-resorcinol, 2-mercaptoalkylphenol where the alkyl group is as set forth above.

While the term "phenol" is used herein, it is to be understood that this term is not intended to limit the aromatic group of the phenol to benzene. Accordingly, it is to be understood that the aromatic group as represented by "Ar", as well as elsewhere in other formulae in this specification and in the appended claims, may be mononuclear or polynuclear. The polynuclear groups can be of the fused type wherein an aromatic nucleus is fused at two points to another nucleus such as found in naphthyl, anthranyl, etc. The polynuclear group can also be of the linked type wherein at least two nuclei (either mononuclear or polynuclear) are linked through bridging linkages to each other. These bridging linkages can be chosen from the group consisting of alkylene linkages, ether linkages, keto linkages, sulfide linkages, polysulfide linkages of 2 to about 6 sulfur atoms, etc.

The number of aromatic nuclei, fused, linked or both, in Ar can play a role in determining the integer values of a and b. For example, when Ar contains a single aromatic nucleus, the sum of a and b is from 2 to 6. When Ar contains two aromatic nuclei, the sum of a and b is from 2 to 10. With a tri-nuclear Ar moiety, the sum of a and b is from 2 to 15. The value for the sum of a and b is limited by the fact that it cannot exceed the total number of displaceable hydrogens on the aromatic nucleus or nuclei of Ar.

The aromatic group Ar may have the same structure as any of the aromatic groups Ar discussed below. Examples of the aromatic groups that are useful herein include the polyvalent aromatic groups derived from benzene, naphthalene, anthracene, etc., preferably benzene. Specific examples of Ar groups include phenylenes and naphthylene, e.g., methylphenylenes, ethoxyphenylenes, isopropylphenylenes, hydroxyphenylenes, dipropoxynaphthylenes, etc.

Within this group of hydroxyaromatic compounds, a useful class of hydroxycarboxylic acids are those of the formula

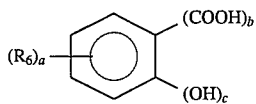

wherein $R_6$ is defined above, a is a number in the range of from one to about four, preferably one to about three; b is a number in the range of one to about four, preferably four to about two, c is a number in the range of zero to about four, preferably one to about two, and more preferably one; with the proviso that the sum of a, b and c does not exceed 6. in one embodiment, b and c are each one and the carboxylic acid is a salicylic acid.

The salicylic acids preferably are hydrocarbyl-substituted salicylic acids. The salicylic acids have the hydrocarbyl substituents derived from the above-described polyalkenes, particularly polymerized lower 1-mono-olefins such as polyethylene, polypropylene, polybutylene, ethylene/propylene copolymers and the like.

The above hydroxyaromatic compounds are well known or can be prepared according to procedures known in the art. Carboxylic acids of the type illustrated by these formulae are known and disclosed, for example, in U.S. Pat. Nos. 2,197,832; 2,197,835; 2,252,662; 2,252,664; 2,714,092; 3,410,798; and 3,595,791.

The second reagent is a hydrocarbon-based aldehyde, preferably a lower aliphatic aldehyde. Suitable aldehydes include formaldehyde, benzaldehyde, acetaldehyde, the butyraldehydes, hydroxybutyraldehydes and heptanals, as well as aldehyde precursors which react as aldehydes under the conditions of the reaction such as paraformaldehyde, paraldehyde, formalin and methal. Formaldehyde and its precursors and reaction synthons (e.g., paraformaldehyde, trioxane) are preferred. Mixtures of aldehydes may be used as the second reagent.

The third reagent is any amine described above. Preferably the amine is any polyamine as described above.

The reaction products of a hydrocarbyl-substituted hydroxyaromatic compounds, aldehydes, and amines are described in the following patents: U.S. Pat. Nos. 3,980,569 and 4,454,059 the disclosures of which are herein incorporated by reference.

The following examples illustrate reaction product A-(ii) and methods of making the same.

EXAMPLE 23

A solution of 4576 parts (4.4 equivalents) of the polybutenylphenol having a molecular weight of about 885, in 3226 parts of mineral oil is heated to 55° C. under nitrogen, with stirring, and 18 parts (0.22 equivalent) of 50% aqueous sodium hydroxide solution is added. The mixture is stirred for 10 minutes and then 320 parts (9.68 equivalents) of paraformaldehyde is added. The mixture is heated at 70°–80° C. for 13 hours, and is then cooled to 60° C. whereupon 20 parts (0.33 equivalent) of acetic acid is added. The mixture is then heated at 110° C. for 6 hours while being blown with nitrogen to remove volatile materials. Nitrogen blowing is continued at 130° C. for an additional 6 hours, after which the solution is filtered at 120° C., using diatomaceous earth.

To the above alkylphenol-formaldehyde concentrate, at 65° C., is added 184 parts (4.48 equivalents) of the polyethylene polyamine mixture containing about 3–7 nitrogen atoms per molecule and about 34.5% by weight nitrogen. The mixture is heated at 110°–135° C. over 4 hours and is then blown with nitrogen at 150°–160° C., for 5 hours as volatiles are removed. Mineral oil, 104 parts, is added and the mixture is filtered at 150° C., using diatomaceous earth, to yield the desired product as a 60% solution in mineral oil containing 1.80% nitrogen.

EXAMPLE 24

To 366 parts (0.2 equivalent) of the alkylphenolformaldehyde condensate of Example 23 is added at 60° C., with stirring, 43.4 parts (0.3 equivalent) of N-(3-aminopropyl-)morpholine. The mixture is heated at 110°–130° C., with nitrogen blowing, for 5 hours It is then stripped of volatiles at 170° C./16 torr, and filtered using diatomaceous earth. The filtrate is the desired product (62.6% solution in mineral oil) containing 1.41% nitrogen.

EXAMPLE 25

Following the procedure of Example 23, a reaction product is prepared from 366 parts (0.2 equivalent) of the alkylphenol-formaldehyde condensate of Example 23 and 31.5 parts (0.3 equivalent) of diethanolamine. It is obtained as a 62.9% solution in mineral oil, containing 0.70% nitrogen.

EXAMPLE 26

To a mixture of 1560 parts (1.5 equivalents) of the polybutenylphenol of Example 23 and 12 parts (0.15 equivalent) of 50% aqueous sodium hydroxide solution is added at 68° C., with stirring, 99 parts (3 equivalents) of paraformaldehyde. The addition period is 15 minutes. The mixture is then heated to 88° C. and 100 parts of a mixture of isobutyl and primary amyl alcohols is added. Heating at 85°–88° C. is continued for 2 hours and then 16 parts of glacial acetic acid is added and the mixture is stirred for 15 minutes and vacuum stripped at 150° C. To the residue is added 535 parts of mineral oil, and the oil solution is filtered to yield the desired intermediate.

To 220 parts (0.15 equivalent) of the intermediate prepared as described above is added 7.5 parts (0.15 equivalent) of hydrazine hydrate. The mixture is heated to 80°–105° C. and stirred at that temperature for 4 hours. Acetic acid, 0.9 parts, is then added and stirring is continued at 95°–125° C. for an additional 6 hours. A further 7.5 part portion of hydrazine hydrate is added and heating and stirring are continued for 8 hours, after which the product is stripped of volatiles under vacuum at 124° C. and 115 parts of mineral oil is added. Upon filtration, the desired product (50% solution in mineral oil) is obtained; it contains 1.19% nitrogen.

Compositions

The compositions generally contain an emulsifying amount of (A) the reaction products (i) or (ii). In one embodiment, the composition contains at least about 0.1 pounds per barrel (ppb) by weight of the reaction products (A). The reaction products may be present in an amount from about 0.5, or about 1, or about 2 up to about 10, or to about 8 or to about 5 pounds per barrel (ppb.).

The compositions of the present invention include a major amount of a mixture of brine and liquid oil, as well as (A) the reaction products (i) or (ii) and (B) a surfactant, and optionally (C) weighting agents, (D) organophilic clays and (E) lime.

Brine—Liquid Mixtures

The brine is present in a mixture with a liquid oil. In one embodiment, the brine is present in the mixture in an amount from about 5, or about 10, or about 15, or about 25 up to about 90, or to about 75, or to about 55 parts by volume. In this embodiment, the liquid oil is present in the mixture in an amount from about 10, or about 25, or about 45 up to about 95, or to about 90, or to about 85, or to about 75 parts by volume. The total parts by volume of brine plus the total parts by volume of liquid oil is 100 parts by volume of the mixture. In one embodiment, the brine is a discontinuous phase and the liquid oil is a continuous phase. In another embodiment, the mixture contains a major amount of a liquid oil, preferably from about 65, or about 70, or about 75 up to about 90, or about 85 parts by volume. In this embodiment, the brine is present in an amount from about 10, or about 15 up to about 35, or about 20, or about 25 parts by volume of the mixture.

The brine useful in the compositions and methods of the present invention may be naturally occurring field brine or one formulated by various salts. The salts include calcium chloride, magnesium chloride, sodium chloride, potassium chloride, zinc chloride, and zinc bromide. The calcium chloride is generally present in an amount from 1% to about 40% by weight of the brine. The magnesium chloride is generally present in an amount from about 0.5% to about 24% by weight of the brine. The sodium chloride is generally present in an amount from about 1% to about 27% by weight of the brine. The potassium chloride is present in an amount from about 0.5% to about 24% by weight of the brine. The zinc chloride or zinc bromide is generally present in an amount from about 0.5% to about 80% by weight of the brine.

The mixture also includes a liquid oil. Examples of these oils include petroleum oils, such as oils of lubricating viscosity, crude oils, diesel oils, mineral seal oils, kerosenes, fuel oils, white oils, and aromatic oils. Liquid oils include natural lubricating oils, such as animal oils, vegetable oils, mineral lubricating oils, solvent or acid treated mineral oils, oils derived from coal or shale, and synthetic oils. Synthetic oils include hydrocarbon oils and halo-substituted hydrocarbon oils such as polymerized and interpolymerized olefins, for example polybutylenes, polypropylenes, propylene-isobutylene copolymers, chlorinated polybutylenes, poly(1-hexenes), poly(1-octenes), poly(1-decenes); alkyl benzenes, such as dodecylbenzenes, tetradecylbenzenes, dinonylbenzenes, di(2-ethylhexyl)benzenes; polyphenyls such as biphenyls, terphenyls, and alkylated polyphenyls; and alkylated diphenyl ethers and alkylated diphenyl sulfides and derivatives, analogs and homologs thereof.

Alkylene oxide polymers and interpolymers and derivatives thereof where terminal hydroxy groups have been modified by esterification, etherification etc. constitute another class of synthetic oils. These are exemplified by polyoxyalkylene polymers prepared by the polymerization of ethylene oxide or propyleneoxide, the alkyl and aryl ethers of these polyoxyalkylene polymers such as methyl-polyisopropylene glycol ethers, diphenyl and diethyl ethers of polyethylene glycol; and mono and polycarboxylic esters thereof, for example, the acetic esters, mixed C3–C8 fatty acid esters and C13 Oxo diester of tetra ethylene glycol. Simple aliphatic ethers may be used as synthetic oils, such as, dioctyl ether, didecyl ether, di(2-ethylhexyl) ether.

Another suitable class of synthetic oils comprises the esters of fatty acids such as ethyl oleate, lauryl hexanoate, and decyl palmitate. The esters of dicarboxylic acids such as phthalic acid, succinic acid, maleic acid, azealic acid, sebacic acid, fumaric acid, adipic acid, linoleic acid dimer, malonic acid, alkyl malonic acids, alkenyl malonic acids with a variety of alcohols such as butyl alcohol, hexyl alcohol, dodecyl alcohol, 2-ethylhexyl alcohol, ethylene glycol, diethylene glycol monoethyl ether, propylene glycol. Specific examples of these esters include dibutyl adipate, di(2-ethylhexyl) sebacate, di-n-hexyl fumarate, dioctyl sebacate, diisooctyl azelate, dioctyl phthalate, didecyl phthalate, dieicosyl sebacate, the 2-ethylhexyl diester of linoleic acid dimer, and the complex ester formed by reacting one mole of sebacic acid with two moles of tetraethylene glycol and two moles of 2-ethyl-hexanoic acid.

In one embodiment, the liquid hydrocarbon is a mineral or vegetable oil having a kinematic viscosity from about 3, or about 3.5, or about 4 up to about 15, or to about 11, or to about 10, or to about 9 centistokes at 100° C. Useful mineral oils include 40, 100, 150, 200 and 300 neutral mineral oils. Examples of specific liquid hydrocarbons include No. 2 diesel oil, Exxon ESCAID® 110 (a petroleum distillate comprising 20% aromatics, 56.6% paraffins and 23.4 naphthenes available commercially from ESSO), Total HDF 200, Conoco LVT oil (a mineral oil with the viscosity of 1.8 centistokes at 40° C. available from Conoco Oil Company), and Conoco LVT 200 (a mineral oil with a viscosity of 2.1 centistokes at 40° C. and less than 0.5% aromatic content, available from Conoco Oil Company).

(B) Surfactant

The surfactant is generally present in the compositions in an amount from about 1, or about 2 up to about 20, or to about 15, or to about 10 pounds per barrel of the composition.

The surfactants include polyoxyalkylene amines, polyoxyalkylene amides, polyoxyalkylene alcohols, polyoxyalkylene phenols, polyoxyalkylene esters, fatty acid salts, amine or alkaline earth or transition metal sulfonates, or reaction products of a hydroxyamine or a polyalkylene polyamine and a carboxylic acylating agent selected from the group consisting of monocarboxylic acylating agents, dicarboxylic acylating agents other than succinic acylating agents and tricarboxylic acylating agents.

Any of the above described polyoxyalkylene amines, including the Jeffamine polyoxyalkylene amines may be used as surfactants in the present invention.

In another embodiment, the polyoxyalkylene amine may be represented by the formula

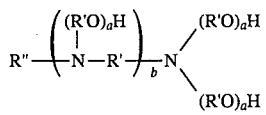

wherein each R' is described above, R" is a hydrocarbyl group; each a is independently an integer from zero to 100, provided at least one a is an integer greater than zero; and b is zero or one.

In one embodiment, R" is a hydrocarbyl group having from 8, or about 10 to about 30 carbon atoms, or to about 24, or to about 18 carbon atoms. R" may be an alkyl or alkenyl group. R" is preferably an octyl, decyl, dodecyl, tridecyl, tetradecyl, hexadecyl, octadecyl, oleyl, soya or tallow group.

a is typically 1, or about 2, or about 3 to about 100, or to about 50, or to about 10.

The above amines can be prepared by techniques well known in the art, and many such amines are commercially available. They may be prepared, for example, by reaction of primary amines containing at least 6 carbon atoms with various amounts of alkylene oxides such as ethylene oxide, propylene oxide, etc. The primary amines may be single amines or mixtures of amines such as obtained by the hydrolysis of fatty oils such as tallow oils, sperm oils, coconut oils, etc. Specific examples of fatty acid amines containing from about 8 to about 30 carbon atoms include saturated as well as unsaturated aliphatic amines such as octyl amine, decyl amine, lauryl amine, stearyl amine, oleyl amine, myristyl amine, palmityl amine, dodecyl amine, and octadecyl amine.

A number of hydroxyamines wherein b is zero are available from the Armak Chemical Division of Akzona, Inc., Chicago, Ill., under the general trade designation "Ethomeen" and "Propomeen". Specific examples of such products include "Ethomeen C/15" which is an ethylene oxide condensate of a cocoamine containing about 5 moles of ethylene oxide; "Ethomeen C/20" and "C/25" which also are ethylene oxide condensation products from cocoamine containing about 10 and 15 moles of ethylene oxide respectively; "Ethomeen O/12" which is an ethylene oxide condensation product of oleylamine containing about 2 moles of ethylene oxide per mole of amine. "Ethomeen S/15" and "S/20" which are ethylene oxide condensation products with soyaamine containing about 5 and 10 moles of ethylene oxide per mole of amine respectively; and "Ethomeen T/12, T/15" and "T/25" which are ethylene oxide condensation products of tallowamine containing about 2, 5 and 15 moles of ethylene oxide per mole of amine respectively. "Propomeen O/12" is the condensation product of one mole of oleyl amine with 2 moles propylene oxide. Preferably, the salt is formed from Ethomeen C/15 or S/15 or mixtures thereof.

Commercially available examples of amines where b is 1 include "Ethoduomeen T/13", "T/20" and "T/25" which are ethylene oxide condensation products of N-tallow trimethylene diamine containing 3, 10 and 15 moles of ethylene oxide per mole of diamine, respectively.

Another group of polyoxyalkylene amines are the commercially available liquid TETRONIC polyoxyalkylated amine polyols sold by Wyandotte Chemicals Corporation. These amines are represented by the general formula:

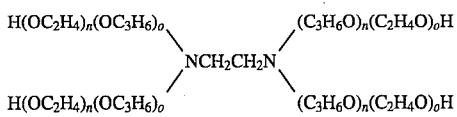

Such hydroxyamines are described in U.S. Pat. No. 2,979,528 which is incorporated herein by reference. In one embodiment, the hydroxyamines corresponding to the above formula have a number average molecular weight of up to about 10,000 wherein the ethyleneoxy groups contribute to the total number average molecular weight in the percentage ranges discussed above. A specific example would be such a hydroxyamine having a number average molecular weight of about 8000 wherein the ethyleneoxy groups account for 7.5%–12% by weight of the total number average molecular weight. Such hydroxyamines can be prepared by reacting an alkylenediamine, such as ethylenediamine, propylenediamine, hexamethylenediamine etc., with propylene oxide. Then the resulting product is reacted with ethylene oxide.

In another embodiment, the polyoxyalkylated amine is a propoxylated hydrazine. Propoxylated hydrazines are available commercially under the tradename Qxypruf™. Examples of propoxylated hydrazines include Qxypruf™ 6, 12 and 20 which are hydrazine treated with 6, 12 and 20 moles of propylene oxide, respectively.

In another embodiment, the surfactant is a polyoxyalkylated fatty amide. Preferably the fatty amide is polyoxypropylated or polyoxyethylated, more preferably polyoxyethylated. Examples of fatty amides which may be polyoxyalkylated include oleylamide, stearylamide, tallowamide, soyaamide, cocoamide, and laurylamide. Polyoxyalkylated fatty amides are available commercially from Armak Company under the trade name Ethomid™ and Lonza, Inc., under the tradename Unamide®. Specific examples of these polyoxyalkylated fatty amides include Ethomid™ HT/15 and HT/60, which are hydrogenated tallow acid amides treated with 5 and 50 moles of ethylene oxide respectively; Ethomid™ O/15, which is an oleic amide treated with 5 moles of ethylene oxide; Unamide® C-2 and C-5, which are cocamides treated with 2 and 5 moles of ethylene oxide, respectively; and Unamide® L-2 and L-5, which are lauramides treated with 2 and 5 moles of ethylene oxide, respectively.

In another embodiment the surfactant is a polyoxyalkylene alcohol, e.g., a polyalkylated alcohol. A variety of polyoxyalkylene alcohols are known in the art, and many are available commercially. The polyoxyalkylene alcohols are produced generally by treating an aliphatic alcohol with an excess of an alkylene oxide such as ethylene oxide or propylene oxide. For example, from about 6 to about 40 moles of ethylene oxide or propylene oxide may be condensed with the aliphatic alcohol.

The polyoxyalkylene alcohols useful in the present invention are available commercially under such trade names as "TRITON®", "CARBOWAX®" and "TERGITOL®" from Union Carbide Chemical Company, "ALFONIC®" from Conoco Chemicals Company, and "NEODOL®" from Shell Chemical Company. The TRITON® materials are identified generally as polyethoxylated alcohols or phenols. The TERGITOLS® are identified as polyethylene glycol ethers of primary or secondary alcohols; the ALFONIC® materials are identified as ethoxylated linear alcohols which may be represented by the general structural formula $$CH_3(CH_2)_l CH_2(OCH_2CH_2)_m OH$$

wherein l varies between 5 and 17 and m is a number between about 3 and 11. Specific examples of ALFONIC® ethoxylates characterized by the above formula include ALFONIC® 1012-60 wherein l is about 8 to 10 and m is an average of about 5 to 6; ALFONIC® 1214-70 wherein l is about 10–12 and m is an average of about 10 to about 11; ALFONIC® 1412-60 wherein l is from 10–12 and m is an average of about 7; and ALFONIC® 1218-70 wherein l is about 10–16 and m is an average of about 10 to about 11.

The Carbowax® methoxy polyethylene glycols are linear ethoxylated polymer of methanol. Examples of these materials include Carbowax® methoxy polyethylene glycol 350, 550 and 750, wherein the numerical value approximates number average molecular weight.

The NEODOL® ethoxylates are ethoxylated alcohols wherein the alcohols are a mixture of alcohols containing from 12 to about 15 carbon atoms, and the alcohols are partially branched chain primary alcohols. The ethoxylates are obtained by reacting the alcohols with an excess of ethylene oxide such as from about 3 to about 12 or more moles of ethylene oxide per mole of alcohol. For example, NEODOL® ethoxylate 23–6.5 is a partially branched chain alcoholate of 12 to 13 carbon atoms with an average of about 6 to about 7 ethoxy units.

The polyoxyalkylene alcohol may be a polyoxyalkylene glycol. The polyoxyalkylene glycols may be polyoxyethylene glycols or polyoxypropylene glycols. Useful polyoxyethylene glycols are available from Union Carbide under the trade name Carbowax® PEG 300, 600, 1000 and 1450. The polyoxyalkylene glycols are preferably polyoxypropylene glycols where the oxypropylene units are at least 80% of the total. The remaining 20% may be ethylene oxide or butylene oxide or other such esters, olefins and the like which may be polarized with polypropylene oxide. Useful polyoxypropylene glycols are available from Union Carbide Chemical Company under the trade name NIAX 425; and NIAX 1025. Useful polyoxypropylene glycols are available from Dow Chemical and sold by the trade name PPG-1200, and PPG-2000.

Representative of other useful polyoxyalkylene polyols are the liquid polyols available from Wyandotte Chemicals company under the name PLURONIC Polyols and other similar polyols. These PLURONIC Polyols correspond to the formula $$HO-(CH_2CH_2O)_i(CHCH_2O)_j(CH_2CH_2O)_k-H$$
$$\phantom{HO-(CH_2CH_2O)_i(}|$$
$$\phantom{HO-(CH_2CH_2O)_i(}CH_3$$

wherein i, j, and k are integers greater than one such that the —$CH_2CH_2O$-groups comprise from about 10% to about 15% by weight of the total number average molecular weight of the glycol, the number average molecular weight of said polyols being from about 2500 to about 4500. This type of polyol can be prepared by reacting propylene glycol with propylene oxide and then with ethylene oxide. A particularly useful polyoxyalkylene polyol is Pluracol® V-10 which is a polyoxyalkylene derivative of trimethylol propane having a molecular weight of about 22,000. This material is available commercially from BASF Corporation, Parsippany, N.J., U.S.A.

In another embodiment, the surfactant is a polyoxyalkylated phenol. The phenol may be substituted or unsubstituted. A preferred polyoxyalkylated phenol is a polyoxyethylated nonylphenol. Polyoxyalkylated phenols are available commercially from Union Carbide Chemical Company under the tradename Triton® and Texaco Chemical Company under the tradename Surfonic®. Examples of polyoxyalkylated phenols include Triton® AG-98, N series, and X series polyoxyethylated nonylphenols.

In another embodiment, the surfactant is a polyoxyalkylene fatty ester. Polyoxyalkylene fatty esters may be prepared from any polyoxyalkylene polyol or an polyoxyalkylene alcohol and a fatty acid. The polyoxyalkylene polyol and the polyoxyalkylene alcohol, e.g., polyoxyalkylated alcohol or phenol, are disclosed above. The fatty acid is preferably the fatty monocarboxylic acid described above. Polyoxyalkylene fatty esters are available commercially from Armak Company under the tradename Ethofat™. Specific examples of polyoxyalkylene fatty esters include Ethofat™ C/15 and C/25, which are coco fatty esters formed using 5 and 15 moles, respectively, of ethylene oxide; Ethofat™ O/15 and O/20, which are oleic esters formed using 5 and 10 moles of ethylene oxide; and Ethofat 60/15, 60/20 and 60/25 which are stearic esters formed with 5, 10 and 15 moles of ethylene oxide respectively.

In one embodiment, the surfactant is a tall oil, such as distilled tall oil available from Union Camp under the tradename Unitol.

In another embodiment, the surfactant is the reaction product of a hydroxyamine or a polyalkylene polyamine with a carboxylic acylating agent selected from the group consisting of monocarboxylic acylating agents, dicarboxylic acylating agents other than succinic acylating agents and tricarboxylic acylating agents. Monocarboxylic acylating agents include fatty carboxylic acylating agents such as fatty acids and reaction products of olefins and alpha,beta-unsaturated carboxylic acylating agents. The fatty acids generally contain from about 8, or about 10, or about 12 to about 30, or to about 24 carbon atoms. Examples of fatty acids include stearic, oleic, lauric, linoleic, abietic, palmitic, sebacic, linolenic, behenic, tall oil and rosin acids.

The monocarboxylic acylating agents may also be the reaction product of an α,β-unsaturated carboxylic acylating agent (e.g., acrylic or methacrylic acylating agents) with one or more olefins. The olefins may be any of the olefins described above.

The carboxylic acylating agents may also be a dicarboxylic acylating agent other than succinic acylating agents. These acylating agents include dimer acylating agents, and reaction products of unsaturated monocarboxylic acylating agents and alpha, beta-unsaturated carboxylic acylating agent.

The dimer acylating agents include products resulting from the dimerization of unsaturated fatty acids, e.g., the above-described fatty acids. Generally, the dimer acids have an average from about 18, or about 28 to about 44, or to about 40 carbon atoms. In one embodiment, the dimer acids have preferably about 36 carbon atoms. The dimer acids are preferably prepared from $C_{18}$ fatty acids, such as oleic acids. The dimer acids are described in U.S. Pat. Nos. 2,482,760, 2,482,761, 2,731,481, 2,793,219, 2,964,545, 2,978,468, 3,157,681, and 3,256,304, the entire disclosures of which are incorporated herein by reference. Examples of dimer acids include Empol® 1014, 1016 and 1018 Dimer Acid, each available from Emery Industries, Inc. and Hystrene® dimer acids 3675, 3680, 3687 and 3695, available from Humko Chemical.

In another embodiment, the carboxylic acylating agents are dicarboxylic acylating agents which are the reaction products of an unsaturated fatty acylating agents (e.g., the above-described fatty acids, preferably tall oil acids and oleic acids) with an alpha,beta-unsaturated monocarboxylic acylating agent (e.g., acrylic or methacrylic acylating agents). These acylating agents are taught in U.S. Pat. No. 2,444,328, the disclosure of which is incorporated herein by reference. Examples of these acylating agents include West-vaco® Diacid H-240, 1525 and 1550, each being commercially available from the Westvaco Corporation.

In another embodiment, the carboxylic acylating agent is a tricarboxylic acylating agent. Examples of tricarboxylic acylating agents include trimer acylating agents and the reaction product of an unsaturated carboxylic acylating agent (such as unsaturated fatty acids) and an alph, beta-unsaturated dicarboxylic acylating agent (such as maleic, itaconic, and citraconic acylating agents, preferably maleic acylating agents). These acylating agents generally contain an average from about 18, or about 30, or about 36 to about 66, or to about 60 carbon atoms. The trimer acylating agents are prepared by the trimerization of the above-described fatty acids. In one embodiment, the dicarboxylic acylating agents made by reacting an unsaturated acylating agent with an alpha, beta-unsaturated dicarboxylic acylating agent contain an average from about 12, or about 18 to about 40, or to about 30 carbon atoms. Examples of these tricarboxylic acylating agents include Empol® 1040 available commercially from Emery Industries, Hystrene® 5460 available commercially from Humko Chemical, and Unidyme® 60 available commercially from Union Camp Corporation.

The above carboxylic acylating agents are reacted with a hydroxyamine or a polyalkylene polyamine to form useful surfactants. Any of the above-described hydroxyamines or polyalkylene amines may be used. In one embodiment the polyalkylene amine is a polyethylene amine, an amine bottom or a condensed amine. In another embodiment, the hydroxyamine is ethanolamine, dimethylethanolamine, diethylethanolamine, aminopropanol, triethanolamine, or diethanolamine.

A useful reaction product of a fatty monocarboxylic acylating agent and a polyamine is made by reacting one or more of a alkylene polyamine, such as triethylenetetraamine, with a mixture of fatty acids having from 5 to about 30 mole percent straight chain acid and about 70 to 95% mole branch chain fatty acids. Among the commercially available mixtures are those known widely in the trade as isostearic acid. These mixtures are produced as a by-product from the dimerization of unsaturated fatty acids as described in U.S. Pat. Nos. 2,812,342; and 3,260,671. These patents are hereby incorporated by reference for their disclosure of these reaction products and methods of making the same.

The branched chain fatty acids can also include those in which the branch is not alkyl in nature, such as found in phenyl and cyclohexyl stearic acid and the chloro-stearic acids. Branched chain fatty carboxylic acid/alkylene polyamine products have been described extensively in the art. See, for example, U.S. Pat. Nos. 3,110,673; 3,251,853; 3,326,801; 3,337,459; 3,405,064; 3,429,674; 3,468,639; and 3,857,791. These patents are hereby incorporated by reference for their disclosures of fatty acid/polyamine condensates.

In another embodiment, the reaction product of a fatty carboxylic acid and a polyamine are further reacted with an epoxide. Epoxides are generally lower aliphatic epoxides, having from 1, or about 2 to about 7, or about 5, or about 4 carbon atoms. Examples of these epoxides include ethylene oxide, propylene oxide, butylene oxide, cyclohexene oxide and octylene oxide. The epoxides generally react in an amount from about 0.5% to about 5% by weight of lower epoxide based on the total weight of the reaction product. The reaction generally occurs at a temperature above about 100° C. The reaction product of a fatty acid, polyamine and epoxide is described in U.S. Pat. No. 3,240,575 which is hereby incorporated by reference for its teachings to carboxylic acids, polyamines, epoxides and reaction products and methods of making the reaction products.

The following examples illustrate the reaction product of a fatty carboxylic acid or anhydride and a polyamine.

EXAMPLE 32

A reaction vessel is charged with 1133 parts of commercial diethylenetriamine and is heated to 110°–150° C. Isostearic acid (6820 parts) is added over a period of two hours. The mixture is held at 150° C. for one hour and then heated to 180° C. over an additional hour. Finally, the mixture is heated to 205° C. over 0.5 hour. During the heating period, the mixture is blown with nitrogen to remove volatiles. The mixture is held at 205°–230° C. for a total of 11.5 hours and then stripped at 230° C./20 torr to provide the desired acylated polyamine as a residue containing 6.2% nitrogen.

EXAMPLE 33

A reaction vessel is charged with 205 parts of a commercial tetraethylene pentamine heated to about 75° C. Isostearic acid (1000 parts) is added to the vessel, while purging with nitrogen. The temperature of the mixture is maintained at about 75°–110° C. The mixture then is heated to 220° C. and held at this temperature until the acid number of the mixture is less than 10. After cooling to about 150° C., the mixture is filtered, and the filtrate is the desired acylated polyamine having a nitrogen content of about 5.9%.

EXAMPLE 34

A reaction vessel is charged with a mixture of equivalent amounts of a naphthenic acid (1270 parts) and oleic acid (1110 parts) having an acid number of 180; the total quantity of the two acids used is such as to provide one equivalent of acid mixture for each two equivalents of the amine mixture used. A mixture (565 parts by weight) of an alkylene amine mixture consisting of triethylenetetramine and diethylene triamine in weight ratio of 3:1 is added to the vessel at 20°–80° C. The reaction is exothermic. The mixture is blown with nitrogen while it is being heated to 240° C. in 4.5 hours and thereafter heated at this temperature for 2 hours. Water is collected as the distillate. Ethylene oxide (140 parts) is added to the above residue at 170°–180° C. within a period of 2 hours while nitrogen is bubbled through the reaction mixture. The reaction mixture is then blown with nitrogen for 15 minutes and diluted with 940 parts of xylene to a solution containing 25% of xylene. The resulting solution has a nitrogen content of 5.4% and a base number of 82.

In another embodiment the surfactant is an amine or alkaline earth or transition metal salt of a sulfonic acid. The salt may be neutral or basic. In other words, the salt may have an excess of metal. The amount of excess metal is commonly expressed in terms of metal ratio. The term "metal ratio" is the ratio of the total equivalents of the metal to the equivalents of the acidic organic compound. A salt having 2 times as much metal as present in a normal salt will have metal excess of 1 equivalents, or a ratio of 2. In the present invention, these salts preferably have a metal ratio from about 1 to about 10, or to about 4, or to about 3, or to about 2. in another embodiment, the salt has a metal ratio between 1, or 1.1 to 1.7, or to 1.5. In another embodiment, the alkaline earth and transition metal salts are neutral salts.

The sulfonic acids are preferably mono-, di-, and tri-aliphatic hydrocarbon-substituted aromatic sulfonic acids. The hydrocarbon substituent may be derived from any of the above-described polyalkenes. Such sulfonic acids include mahogany sulfonic acids, bright stock sulfonic acids, petroleum sulfonic acids, mono- and polywax-substituted naphthalene sulfonic acids, saturated paraffin wax sulfonic acids, unsaturated paraffin wax sulfonic acids, hydroxy-substituted paraffin wax sulfonic acids, tetraisobutylene sulfonic acids, tetra-amylene sulfonic acids, lauryl cyclohexyl sulfonic acids, mono- and polywax-substituted cyclohexyl sulfonic acids, dodecylbenzene sulfonic acids, didodecylbenzene sulfonic acids, dinonylbenzene sulfonic acids, and the like.

A preferred group of sulfonic acids are mono-, di-, and tri-alkylated benzene and naphthalene (including hydrogenated forms thereof) sulfonic acids. Illustrative of the synthetically produced alkylated benzene and naphthalene sulfonic acids are those containing alkyl substituents having from about 8, or about 12 to about 40, or to about 30, or to about 24 carbon atoms. Such acids include di-isododecylbenzene sulfonic acid, wax-substituted phenol sulfonic acid, wax-substituted benzene sulfonic acids, polybutenyl-substituted sulfonic acid, polypropylenyl-substituted sulfonic acids derived from polypropylene having a number average molecular weights ($\overline{Mn}$) of about 300–1500, more preferably about 800–1200, cetyl-chlorobenzene sulfonic acid, di-cetylnaphthalene sulfonic acid, di-lauryldiphenylether sulfonic acid, diisononylbenzene sulfonic acid, di-isooctadecylbenzene sulfonic acid, stearylnaphthalene sulfonic acid, and the like.

In one embodiment, the sulfonic acid is an alkyl-substituted benzene sulfonic acid. The alkyl group generally contains at least 8 carbon atoms, or from about 8, or about 10, to about 40, or to about 30, or to about 24 carbon atoms. In one embodiment, the sulfonic acid is a dodecyl benzene "bottoms" sulfonic acid. The latter are acids derived from benzene which has been alkylated with propylene tetramers or isobutene trimers to introduce 1, 2, 3, or more branched-chain $C_{12}$ substituents on the benzene ring. Dodecyl benzene bottoms, principally mixtures of mono- and di-dodecyl benzenes, are available as by-products from the manufacture of household detergents. Similar products obtained from alkylation bottoms formed during manufacture of linear alkyl sulfonates (LAS) are also useful in making the sulfonates used in this invention.

The production of sulfonic acids from detergent manufacture by-products by reaction with, e.g., $SO_3$, is well known to those skilled in the art. See, for example, the article "Sulfonates" in Kirk-Othmer "Encyclopedia of Chemical Technology", Second Edition, Vol. 19, pp. 291 et seq. published by John Wiley & Sons, New York (1969).

The salt of the sulfonic acid may be derived from an amine or an alkaline earth or transition metal compound. Any of the above described amines may be used. The alkaline earth and transition metal salt include magnesium, calcium, barium, titanium, iron, and zinc salts. In one embodiment, the metal salt is an alkaline earth metal salt, preferably a calcium or barium sulfonate, preferably a calcium sulfonate.

The metal salts are prepared by procedures known to those in the art. One method of their preparation is to mix a sulfonic acid with an alkaline earth of transition metal containing base, such as an oxide or hydroxide.

(C) Weighting Agents

The compositions of the present invention may additionally contain weighting agents. These agents increase density of drilling muds and include galena (PbS), hematite ($Fe_2O_3$), magnetite ($Fe_3O_4$), ilmenite ($FeTiO_3$), barite ($BASO_4$), siderite ($FeCO_3$), celestite ($SrSO_4$), dolomite ($CaMg(CO_3)_2$), and calcite ($CaCO_3$). Particularly useful weighting agents include barium sulfate and iron oxide. Weighting agents may also be soluble salts such as sodium chloride, sodium bromide, sodium carbonate, potassium chloride, potassium carbonate, calcium bromide, zinc chloride, and zinc bromide. The weighting agents may be present in an amount from about 20, or about 100, or about 250, to about 1900, or to about 700, or to about 600. In one embodiment, the weighting agent is present in an amount from about 300 to about 500 or about 400 pounds per barrel (ppb).

(D) Organophilic Clay

The compositions may also contain commercial clays such as bentonite, attapulgite, sepiolite, etc. In one embodiment, the compositions may also include an organophilic clay. Organophilic clays are clays, such as montmorillonite, hectorite, saponite, attapulgite and illite, that have absorbed amine salts. These clays are converted from water-yielding (e.g., present in the brine phase of the emulsion) to oil-yielding (e.g., present in the liquid oil phase) clays by the absorption of amine salts. Organophilic clays are preferably oil-wetable and are dispersed in the oil phase to produce viscosity and gel properties. Montmorillonite, bentonite and attapulgite are preferred, with mortmorillonite more preferred. Water and methanol may be used to activate the organophilic clay. The organophilic clay is present in an amount from about 1, or about 2 up to about 10, or to about 8 pounds per barrel (ppb).

Lime

The compositions of the present invention may also include lime. The lime in combination with the reaction products or their salts (A) provides improved thickening to the compositions. The lime is generally present in an amount from about 1, or about 2, up to about 10, or about 8 pounds per barrel (ppb).

Well-Drilling Compositions

In one embodiment, the compositions of the present invention are well-drilling compositions. In one embodiment, the well-drilling compositions are invert water-in-oil emulsions. The well-drilling compositions generally have a density of about 9, or about 10 to about 21, or to about 18, or to about 14 pounds per gallon.

In one embodiment, the compositions of the present invention contain less than 1%, or less than 0.5% by weight of an oxygen-supplying salt. In another embodiment, the compositions are free of oxygen-supplying salts. These salts include ammonium nitrate and alkali or alkaline earth metal nitrates, chlorates, perchlorates and mixtures thereof. Specific examples of the oxygen-supplying salts are sodium nitrate, sodium perchlorate and ammonium perchlorate. The oxygen-supplying salts are used in an emulsion explosives. In one embodiment, the compositions of the present invention are non-explosive.

In another embodiment, the compositions contain less than 1% by weight, or 0.5% by weight of a non-oxidizing acid. In one embodiment, the compositions are free of non-oxidizing acids. These acids include an inorganic acid such as hydrochloric acid, sulfuric acid, hydrofluoric acid, sulfamic acid and the like, as well as organic acids including 1 to about 3 carbon atoms such as formic acid, acetic acid, propionic acid and the like. These non-oxidizing acids are typically used in acidizing fluids and in this embodiment are not present in the compositions of the present invention.

In one embodiment, the surfactant is included in well-drilling compositions along with barites (barium sulfates) or organophilic clays. In one embodiment the surfactant is the reaction product of a fatty carboxylic acylating agent and a polyamine (e.g., and in one embodiment an imidiazoline) or an alkaline earth or transition metal of a sulfonate.

The following examples relate to the compositions of the present invention. As used in the following table "ppb" refers to pounds per barrel.

Example A

A composition is prepared by mixing 23.9 gallons of Conoco LVT 200 oil and 7.1 gallons of calcium chloride brine (30% by weight calcium chloride in water). Then, 6 ppb of the product of Example 19, 1 ppb of the product of Example 33, 3 ppb of lime, 4 ppb of CARBO-GEL (a organophilic clay available commercially from Milpark), and 350 ppb of MIL BAR (barium sulfate available from Milpark) are added to the mixture. The contents are mixed in a waring blender to form a water-in-oil emulsion.

Examples B–K

Following the procedure of Example A, the examples in the following table are prepared. In the following examples "bbl" means barrels and "ppb" means pounds per barrel.

TABLE

|  | Ex. B | Ex. C | Ex. D | Ex. E | Ex. F |
|---|---|---|---|---|---|
| Conoco LVT 200 (bbl.) | 0.57 | 0.57 | 0.57 | 0.57 | 0.57 |
| Product of Ex. 12 (ppb) | 1 | — | 6 | 4 | — |
| Product of Ex. 19 (ppb) | — | 5 | 2 | — | 6 |
| Lime (ppb) | 3 | 5 | 3 | 5 | 3 |
| CARBO-GEL (ppb) | 4 | 2 | 2 | 4 | 2 |
| Product of Ex. 13 (ppb) | 4 | — | 5 | 2 | 5 |
| Calcium Sulfonate[(1)] | — | 4 | 3 | — | — |
| Product of Example 33 (ppb) | — | 1 | — | 5 | 3 |
| 30% CaCl₂ Brine (bbl.) | 0.17 | 0.17 | 0.17 | 0.17 | 0.17 |
| MIL-BAR (ppb) | 350 | 375 | 325 | 350 | 340 |

|  | Ex. G | Ex. H | Ex. I | Ex. J |  |
|---|---|---|---|---|---|
| No. 2 Diesel fuel (bbl.) | 0.48 | 0.55 | — | — | |
| Conoco LVT 200 (bbl.) | — | — | 0.48 | 0.55 | |
| Product of Ex. 12 (ppb) | 5 | 6 | — | — | |
| Product of Ex. 23 (ppb) | — | — | 4 | 6 | |
| Lime (ppb) | 3 | 2 | 5 | 3 | |
| CARBOGEL (ppb) | 3 | 2 | 3 | 4 | |
| Product of Ex. 33 (ppb) | 2 | — | 5 | 3 | |
| Calcium Sulfonate[(1)] | — | 3 | 1 | — | |
| 30% CaCl₂ Brine (bbl.) | 0.34 | 0.26 | 0.34 | 0.26 | |
| MILBAR (ppb) | 300 | 325 | 375 | 350 | |

[(1)]A 60% by weight oil composition of a neutral calcium sulfonate with a metal ratio of 1 and a 5 total base number (bromophenol blue).

Example K

A composition is prepared by mixing 294 milliliters of diisodecyl ether and 74.2 grams of water and 26.0 grams of calcium chloride. Then, 8 grams of the product of Example 22, 2.5 grams of the product of Example 33, 2.5 grams of the product of Example 16, 5 grams of lime, 6 grams of organophilic clay, and 397 grams of barite are added to the mixture. The contents are mixed in a Waring blender to form a water-in-oil emulsion.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A composition comprising a mixture of a brine and a synthetic liquid oil, and (A) an emulsifying amount of (i) at least one reaction product of a hydrocarbyl-substituted succinic acylating agent, and at least one of (a) ammonia, (b) an alcohol, or (c) an amine, or at least one salt of the reaction product; or (ii) at least one reaction product of a hydroxyaromatic compound, an aldehyde, and an amine, and (B) at least one surfactant selected from the group consisting of a polyoxyalkylene amine, a polyoxyalkylene amide, a polyoxyalkylene alcohol, a polyoxyalkylene phenol, a polyoxyalkylene ester, a fatty acid salt, an amine or an alkaline earth or transition metal sulfonate, or a reaction product of a hydroxyamine or a polyalkylene polyamine with an acylating agent selected from the group consisting of a fatty monocarboxylic acylating agent, a dicarboxylic acylating agent other than a succinic acylating agent, and a tricarboxylic acylating agent.

2. The composition of claim 1 wherein the hydrocarbyl group of (i) contains an average from about 8 to about 300 carbon atoms.

3. The composition of claim 1 wherein the hydrocarbyl group of (i) contains an average from about 8 to about 40 carbon atoms.

4. The composition of claim 1 wherein the hydrocarbyl group of (i) contains an average of about 10 to about 20 carbon atom.

5. The composition of claim 1 wherein the hydrocarbyl group of (i) is derived from a polyalkene having a number average molecular weight of at least about 500.

6. The composition of claim 1 wherein the hydrocarbyl group of (i) is derived from a polyalkene having a number average molecular weight from about 700 to about 1500.

7. The composition of claim 1 wherein the hydrocarbyl group of (i) is derived from a polybutene or polypropylene.

8. The composition of claim 1 wherein the hydrocarbyl group of (i) is derived from a polyalkene having a number average molecular weight from about 1300 to about 5000 and wherein the number of equivalents of succinic groups to the number of equivalents of hydrocarbyl group is at least about 1.3.

9. The composition of claim 1 wherein the hydrocarbyl-substituted succinic acylating agent is reacted with an alcohol.

10. The composition of claim 9 wherein the alcohol is represented by the formula R"(OH)$_m$ wherein R" is a monovalent or polyvalent hydrocarbyl group and m is an integer from 1 to about 10.

11. The composition of claim 9 wherein the alcohol is selected from the group consisting of ethylene glycol, diethylene glycol, triethylene glycol, propylene glycol, dipropylene glycol, tripropylene glycol, glycerol, erythritol, dierythritol, trierythritol, pentaerythritol, dipentaerythritol, tripentaerythritol, butane diol, hexane diol, trimethylolpropane, neopentyl glycol, triglycerine, cyclohexane diol, and a sugar.

12. The composition of claim 1 wherein (i) is the reaction product of a hydrocarbyl-substituted carboxylic acylating agent and an amine selected from the group consisting of a monoamine and a polyamine.

13. The composition of claim 12 wherein the amine is a monoamine, containing alkyl groups each independently containing from 1 to about 30 carbon atoms.

14. The composition of claim 12 wherein the amine is a polyalkylene polyamine.

15. The composition of claim 12 wherein the amine is a hydroxyamine.

16. The composition of claim 12 wherein the amine is monoethanolamine, diethanolamine, triethanolamine, dimethylethanolamine, diethylethanolamine, dimethylaminopropanol, diethylaminopropanol, or aminopropanol.

17. The composition of claim 1 wherein (i) is an ammonium or metal salt.

18. The composition of claim 1 wherein (i) is an alkali, alkaline earth or transition metal salt.

19. The composition of claim 1 wherein (i) is a sodium or calcium salt.

20. The composition of claim 17 wherein (i) is an ammonium salt derived from a hydroxyamine.

21. The composition of claim 20 wherein the hydroxyamine is monoethanolamine, diethanolamine, triethanolamine, dimethylethanolamine, diethylethanolamine, dimethylaminopropanol, diethylaminopropanol, or aminopropanol.

22. The composition of claim 1 wherein (i) is an ester-salt.

23. The composition of claim 1 wherein the hydroxyaromatic compound of (ii) is hydrocarbyl-substituted.

24. The composition of claim 23 wherein the hydrocarbyl group of (i) contains an average of about 8 to about 300 carbon atoms.

25. The composition of claim 1 wherein the hydroxyaromatic compound of (ii) is a phenol and the aldehyde of (ii) is formaldehyde, paraformaldehyde, or trioxane.

26. The composition of claim 1 wherein the amine of (ii) is an alkylene polyamine.

27. The composition of claim 1 wherein the polyoxyalkylene groups are polyoxyethylene group, polyoxypropylene group, polyoxybutylene group or mixtures thereof.

28. The composition of claim 1 wherein the surfactant is a reaction product of a fatty carboxylic acylating agent and a polyalkylenepolyamine.

29. The composition of claim 1 wherein the surfactant is the reaction product of a fatty carboxylic acylating agent and a hydroxyamine.

30. The composition of claim 1 wherein the surfactant is a polyoxyalkylene alcohol or phenol.

31. The composition of claim 1 wherein the surfactant is a calcium or barium sulfonate.

32. The composition of claim 1, further comprising (C) at least one weighting agent or (D) at least one organophilic clay.

33. The composition of claim 32 wherein the weighting agent (C) is barium sulfate, iron oxide, calcium chloride, calcium bromide, zinc bromide, or zinc chloride.

34. The composition of claim 1 wherein the brine is present in the mixture in an amount from about 5 to about 90 parts by volume, and the liquid oil is present in the mixture in an amount from 10 to about 95 parts by volume, wherein the total parts by volume of brine and hydrocarbon total 100 parts by volume.

35. The composition of claim 1 wherein the brine is a discontinuous phase and the liquid oil is a continuous phase.

36. A composition comprising a mixture of from about 5 to about 90 parts by volume of a brine as a discontinuous phase, and from 10 to 95 parts by volume of a synthetic liquid oil as a continuous phase, wherein the total parts by volume of brine and synthetic liquid oil total 100 parts by volume, and (A) an emulsifying amount of at least one reaction product of a hydrocarbyl-substituted succinic acylating agent, having a hydrocarbyl group containing an average from about 8 to about 300 carbon atoms, and a hydroxyamine, or a salt of the reaction product and (B) at least one surfactant selected from the group consisting of a polyoxyalkylene amine, a polyoxyalkylene amide, a polyoxyalkylene alcohol, a polyoxyalkylene phenol, a polyoxyalkylene ester, a fatty acid salt, an amine or an alkaline earth or transition metal sulfonate, or a reaction product of a hydroxyamine or a polyalkylenepolyamine with an acylating agent selected from the group consisting of a fatty monocarboxylic acylating agent, a dicarboxylic acylating agent other than a succinic acylating agent, and a tricarboxylic acylating agent.

37. The composition of claim 36 wherein the hydrocarbyl group is derived from polyalkene having a number average molecular weight from about 700 to about 1500.

38. The composition of claim 36 wherein the hydroxyamine is a alkanolamine.

39. The composition of claim 36 wherein the hydroxyamine is monoethanolamine, diethanolamine, triethanolamine, diethylethanolamine, dimethylethanolamine, dimethylaminopropanol, diethylaminopropanol, or aminopropanol.

40. The composition of claim 36 wherein (A) is a ester-salt.

41. The article of claim 36 wherein the polyoxyalkylene groups are polyoxyethylene group, polyoxypropylene group, polyoxybutylene or mixtures thereof.

42. The article of claim 36 wherein the surfactant is the reaction product of a fatty carboxylic acylating agent and a hydroxyamine or a polyalkylenepolyamine.

43. The composition of claim 36 wherein the surfactant is a calcium or barium sulfonate.

44. The composition of claim 36, further comprising (C) a weighting agent selected from barium sulfate, iron oxide, calcium chloride, calcium bromide, zinc chloride, and zinc bromide, or (D) an organophilic clay.

45. A composition compromising a mixture of from about 5 to about 90 parts by volume of a brine as a discontinuous phase, and from 10 to 95 parts by volume of a synthetic liquid oil as a continuous phase, wherein the total parts by volume of the brine and synthetic liquid oil is 100 parts by volume and (A) an emulsifying amount of (i) at least one reaction produce of a hydrocarbyl-substituted succinic acylating agent, and at least one of (a) ammonia, (b) an alcohol, (c) an amine, (d) or mixtures thereof, or (ii) at least one reaction product of a hydroxyaromatic compound, an aldehyde and an amine, and (B) at least one surfactant selected from the group consisting of a polyoxyalkylene amine, a polyoxyalkylene amide, a polyoxyalkylene alcohol, a polyoxyalkylene phenol, a polyoxyalklene ester, a fatty acid salt, an amine or an alkaline earth or transition metal sulfonate, or a reaction product of a hydroxyamine or a polyalkylenepolyamine with an acylating agent selected from the group consisting of a fatty monocarboxylic acylating agent, a dicarboxylic acylating agent other than a succinic acylating agent, and a tricarboxylic acylating agent, and optionally (C) a weighing agent or (D) an organophilic clay.

46. The composition of claim 45 wherein (i) is a reaction product of a hydrocarbyl-substituted succinic acylating agent and an alkanolamine.

47. The composition of claim 45 wherein the surfactant (B) is a calcium or barium sulfonate, or a reaction product of a fatty carboxylic acylating agent and a polyalkylene polyamine.

48. The composition of claim 45 wherein the weighting agent (C) is barium sulfate, iron oxide, calcium chloride, calcium bromide, zinc chloride, or zinc bromide.

49. A method, comprising the steps of introducing the composition of claim 1 into a wellbore and drilling, completing or working over the wellbore hole.

50. A method, comprising the steps of introducing the composition of claim 36 into a wellbore hole and drilling, completing or working over the wellbore hole.

51. A method, comprising the steps of introducing the composition of claim 45 into a wellbore hole and drilling, completing or working over the wellbore hole.

* * * * *